(12) United States Patent
Xue et al.

(10) Patent No.: US 12,492,405 B2
(45) Date of Patent: *Dec. 9, 2025

(54) PROMOTER AND CARRIER COMPOSED OF SAME AND APPLICATION THEREOF

(71) Applicant: Azenta US, Inc., Burlington, MA (US)

(72) Inventors: Gaoxu Xue, Jiangsu (CN); Yankai Jia, Jiangsu (CN); Tianming Qi, Jiangsu (CN); Aihua Feng, Jiangsu (CN); Zhengli Xie, Jiangsu (CN); Xin Wu, Jiangsu (CN); Zhongping Sun, Jiangsu (CN); Guojuan Liao, Jiangsu (CN)

(73) Assignee: AZENTA US, INC., Burlington, MA (US)

( * ) Notice: Subject to any disclaimer, the term of this patent is extended or adjusted under 35 U.S.C. 154(b) by 862 days.

This patent is subject to a terminal disclaimer.

(21) Appl. No.: 16/916,032

(22) Filed: Jun. 29, 2020

(65) Prior Publication Data
US 2021/0040488 A1 Feb. 11, 2021

Related U.S. Application Data

(63) Continuation-in-part of application No. PCT/CN2018/122312, filed on Dec. 20, 2018.

(51) Int. Cl.
*C12N 15/66* (2006.01)
*C12P 21/00* (2006.01)

(52) U.S. Cl.
CPC .............. *C12N 15/66* (2013.01); *C12P 21/00* (2013.01); *C12N 2800/22* (2013.01); *C12N 2800/60* (2013.01); *C12N 2830/001* (2013.01); *C12N 2830/15* (2013.01); *C12Q 2525/143* (2013.01)

(58) Field of Classification Search
CPC ................ C12N 15/66; C12N 2800/22; C12N 2800/60; C12N 2830/001; C12N 2830/15; C12N 15/70; C12N 9/2471; C12P 21/00; C12Q 2525/143; C12Y 302/01023
See application file for complete search history.

(56) References Cited

U.S. PATENT DOCUMENTS

| | | | |
|---|---|---|---|
| 5,652,095 A | 7/1997 | Taniguchi et al. | |
| 5,691,140 A * | 11/1997 | Noren .................... | C12N 15/73 435/5 |
| 6,509,185 B1 | 1/2003 | Valle et al. | |
| 6,818,611 B1 | 11/2004 | Altman | |
| 6,911,322 B2 | 6/2005 | Valle et al. | |
| 7,122,516 B2 | 10/2006 | Altman | |
| 7,132,527 B2 * | 11/2006 | Payne ....................... | C12P 7/18 435/320.1 |
| 7,199,233 B1 | 4/2007 | Jensen et al. | |
| 8,663,956 B2 | 3/2014 | Mcfarland et al. | |
| 2003/0148461 A1 | 8/2003 | Valle et al. | |
| 2003/0215907 A1 | 11/2003 | Samuelson et al. | |
| 2004/0115642 A1 * | 6/2004 | Fu .......................... | C12N 15/66 435/6.18 |
| 2004/0235091 A1 | 11/2004 | Altman | |
| 2015/0067922 A1 | 3/2015 | Yang et al. | |
| 2016/0272965 A1 | 9/2016 | Zhang et al. | |
| 2017/0009221 A1 | 1/2017 | Arikawa et al. | |
| 2018/0298377 A1 | 10/2018 | Levy et al. | |
| 2021/0032636 A1 | 2/2021 | Xue et al. | |
| 2023/0187025 A1 | 6/2023 | Xu et al. | |

FOREIGN PATENT DOCUMENTS

| | | |
|---|---|---|
| CN | 1190993 A | 8/1998 |
| CN | 1233287 A | 10/1999 |
| CN | 1425071 A | 6/2003 |
| CN | 104513830 A | 4/2015 |
| CN | 105400809 A | 3/2016 |
| CN | 105886616 A | 8/2016 |
| CN | 105907632 A | 8/2016 |
| CN | 106845151 A | 6/2017 |
| CN | 106939310 A | 7/2017 |
| CN | 107058316 A | 8/2017 |
| CN | 107090466 A | 8/2017 |
| CN | 107365793 A | 11/2017 |

(Continued)

OTHER PUBLICATIONS

LeClerc, J. Eugene, and Nancy L. Istock. "Specificity of UV mutagenesis in the lac promoter of M13 lac hybrid phage DNA." Nature 297.5867 (1982): 596-598 (Year: 1982).*
Binder, Andreas, et al. "A modular plasmid assembly kit for multigene expression, gene silencing and silencing rescue in plants." PLoS One 9.2 (2014): e88218 (Year: 2014).*
Zhou, Ming-Yi, and Celso E. Gomez-Sanchez. "Universal TA cloning." Current issues in molecular biology 2.1 (2000): 1-7 (Year: 2000).*
LeClerc, J. Eugene, and Nancy L. Istock. "M13 single stranded phage DNA with E.coli insert, including the regulatory region of the lac operon promoter . . . " Nature 297.5867 (1982): 596-598 (Year: 1982).*
PG Pub No. US 2004/0115642 A1, Synthetic construct CcdB (ccdB) gene, complete cds. (Year: 2004).*

(Continued)

*Primary Examiner* — Anne M. Gussow
*Assistant Examiner* — Kyle T Rega
(74) *Attorney, Agent, or Firm* — HAMILTON, BROOK, SMITH & REYNOLDS, P.C.

(57) ABSTRACT

An improved promoter and a use thereof. An improvement is to mutate a nucleic acid sequence between −35 region and −10 region in a promoter region into recognition sites for an endonuclease. The improvement can overcome the problem that a strong promoter in a vector based on blue-white screening initiates the transcription or translation of foreign genes and a transcription or translation product might be toxic to a host and cannot be cloned, avoid the deficiency that frameshift mutation of a gene due to a lack of 1-2 bp of the vector at digestion sites results in false positive clones, and eliminate a false negative phenomenon that a plate is rich in blue spots due to a small fragment of foreign DNA and a reading frame of the gene which is unchanged by inserting the foreign DNA.

18 Claims, 1 Drawing Sheet
Specification includes a Sequence Listing.

(56) References Cited

FOREIGN PATENT DOCUMENTS

| | | | | |
|---|---|---|---|---|
| CN | 108060168 | A | 5/2018 | |
| CN | 108118058 | A | 6/2018 | |
| CN | 108118059 | A | 6/2018 | |
| CN | 108130338 | A | 6/2018 | |
| CN | 108165551 | A | 6/2018 | |
| CN | 108205614 | A | 6/2018 | |
| CN | 108221058 | A | 6/2018 | |
| CN | 108588102 | A | 9/2018 | |
| EP | 1 400 593 | A1 | 3/2004 | |
| EP | 1564294 | A1 | 8/2005 | |
| EP | 3 733 849 | A1 | 11/2020 | |
| EP | 3 733 851 | A1 | 11/2020 | |
| EP | 3 733 936 | A1 | 11/2020 | |
| EP | 3 734 602 | A1 | 11/2020 | |
| WO | 00/22112 | A1 | 4/2000 | |
| WO | WO-2011091324 | A2 * | 7/2011 | ......... C07K 14/4703 |
| WO | 2015/065964 | A1 | 5/2015 | |
| WO | 2015/115619 | A1 | 8/2016 | |
| WO | 2016/196805 | A1 | 12/2016 | |
| WO | 2017/075529 | A1 | 5/2017 | |
| WO | 2017/181735 | A2 | 10/2017 | |
| WO | 2019/128743 | A1 | 7/2019 | |
| WO | 2019/128744 | A1 | 7/2019 | |
| WO | 2019/128836 | A1 | 7/2019 | |
| WO | 2019/128837 | A1 | 7/2019 | |

OTHER PUBLICATIONS

Dubendorf (Journal of molecular biology 219.1 (1991): 45-59) (Year: 1991).*

PCT International Preliminary Report on Patentability and Written Opinion for International Application No. PCT/CN2018/122312, entitled "Improved Promoter And Carrier Composed Of Same And Application Thereof" Mailed on Jul. 9, 2020.

PCT International Search Report and Written Opinion for International Application No. PCT/CN2018/122312, entitled "Improved Promoter And Carrier Composed Of Same And Application Thereof" Mailed on Jul. 9, 2020.

Hu, et al. "Associations between Hepatitis B Virus Basal Core Promoter/Pre-Core Region Mutations and the Risk of Acute-on-Chronic Liver Failure: a Meta-Analysis," Virology Journal, vol. 12, No. 87, Dec. 31, 2015, pp. 1-13.

Hsu, et al,. "Development and Applications of CRISPR-Cas9 for Genome Engineering," Cell. Jun. 5, 2014, 157(6), pp. 1262-1278.

Shen, "Modification and Expression of LipA Promoter in Bacillus Subtilis," Chinese Master's Theses Full-text Database Basic Science. Sep. 15, 2009, No. 9.

Yang, et al., "Application of the CRISPR/Cas9 Gene Editing Technology in Pigs," May 31, 2017, vol. 293, pp. 71-76. Heilongjiang Animal Science and Veterinary Medicine.

Rodriguez et al: "Characterizing wild-type and mutant promoters of the tetracycline resistance gene in pBR3 13", Nucleic Acids Research, vol. 6, No. 10, 1979, p. 3267-3287.

De Boer et al: "Construction of Three Hybrid Promoters and Their Properties in *Escherichia coli*", Proc. Miami. Winter. Symposia, vol. 19, Jan. 1982 (Jan. 1, 1982), pp. 309-327.

Moreno et al: "ihfA Gene of the Bacterium Myxococcus xanthus and Its Role in Activation of Carotenoid Genes by Blue Light", Journal of Bacteriology, American Society for Microbiology, vol. 183, No. 2, Jan. 2001, pp. 557-569.

Berg et al: "Specificity of Transposon Tn5 Insertion", Genetics Society of America, Dec. 1983, pp. 813-828.

Extended European Search Report for EP Application No. 18893487, mailed on Dec. 15, 2021.

Database Geneseq (Online), "*Escherichia coli* lac promoter, Seq ID 49." Retrieved from EBI accession No. GSN: BCD14467, Database accession No. BCD14467, Sep. 24, 2015 (Sep. 24, 2015).

Kostylev Maxim et al. "Cloning Should Be Simple: *Escherichia coli* DH5[alpha]-Mediated Assembly of Multiple DNA Fragments with Short End Homologies", PLoS One, vol. 10, No. 9, Sep. 8, 2015 (Sep. 8, 2015).

Jain et al. "New improved lacZ gene fusion vectors", Gene, Elsevier Amsterdam, NL, vol. 133, No. 1, Oct. 29, 1993 (Oct. 29, 1993), pp. 99-102.

PCT International Preliminary Report on Patentability and Written Opinion for International Application No. PCT/CN2018/121326, entitled "Pig Whole Genome SGRNA Library, And Construction Method Therefor And Application Thereof" Mailed on Jul. 9, 2020.

PCT International Search Report and Written Opinion for International Application No. PCT/CN2018/121326, entitled "Pig Whole Genome SGRNA Library, And Construction Method Therefor And Application Thereof" Mailed on Mar. 19, 2019.

PCT International Preliminary Report on Patentability and Written Opinion for International Application No. PCT/N2018/121328, entitled "Whole Genome SGRNA Library Constructing System And Application Thereof" Mailed on Jul. 9, 2020.

PCT International Search Report and Written Opinion for International Application No. PCT/CN2018/121328, entitled "Whole Genome SGRNA Library Constructing System And Application Thereof" Mailed on Mar. 19, 2019.

PCT International Preliminary Report on Patentability and Written Opinion for International Application No. PCT/CN2018/122309, entitled "Improved Promoter And Use Thereof" Mailed on Jul. 9, 2020.

PCT International Search Report and Written Opinion for International Application No. PCT /CN2018/122309, entitled "Improved Promoter And Use Thereof" Mailed on Mar. 22, 2019.

Wang, et al: "Refinement of the Smallest Commonly Deleted Segment of Chromosome 20 in Malignant Myeloid Diseases and Development of a PAC-Based Physical and Transcription Map" Genomics, Academic Press, San Diego, US, vol. 67, No. 1, Jul. 1, 2000 (Jul. 1, 2000), pp. 28-39.

U.S. Non-Final Office Action for U.S. Appl. No. 16/914,266, entitled "Promoter and Use Thereof," mailed on Dec. 23, 2022.

Bibb, et al., "Cloning and analysis of the promoter region of the erythromycin resistance gene (ermE) of Streptomyces erythraeus," Gene, 1985, vol. 38: 215-226. (Year: 1985).

Leclerc, et al., "Specificity of UV mutagenesis in the lac promoter of MI3lac hybrid phage DNA," Nature, 1982, vol. 297; 596-598. (Year: 1982).

Satola et al., "Binding of Spo0A Stimulates spoIIG Promoter Activity in Bacillus subtilis," J. Bacteriol., 1992, vol. 17 4(5): 1448-1453. (Year: 1992).

Short et al., "λ Zap: a bacteriophage λ expression vector with in vivo excision properties," Nuc. Acids Res., 1988, vol. 16(1): 7583-7600. (Year: 1988).

Final Office Action received for U.S. Appl. No. 16/914,266, mailed on Jul. 7, 2023, 32 pages.

International Search Report and Written Opinion received for PCT Patent Application No. PCT/CN2018/121328, mailed on Mar. 19, 2019, 14 pages (7 pages of English Translation and 7 pages of Original Document).

International Search Report and Written Opinion received for PCT Patent Application No. PCT/CN2018/122312, mailed on Mar. 21, 2019, 23 pages (11 pages of English Translation and 12 pages of Original Document).

Liu et al., "Cloning vector pUCS7-Kan, complete sequence," GenBank: JF826242.2. May 16, 2012.

Miyazaki K., "Lethal ccdB gene-based zero-background vector for construction of shotgun libraries;" J Biosci Bioeng. Sep. 2010;110(3):372-3. doi: 10.1016/j.jbiosc.2010.02.016. Epub Apr. 1, 2010. PMID: 20547347.

Phillips et al., "Diversity in lac Operon Regulation among Diverse *Escherichia coli* Isolates Depends on the Broader Genetic Background but Is Not Explained by Genetic Relatedness;" mBio, 2019, vol. 10(6), e02232-19, pp. 1-14. (Year: 2019).

U.S. Final Office Action for U.S. Appl. No. 16/914,266, entitled "Promoter and Use Thereof," mailed on Jul. 7, 2023.

Vlkova et al., "Transcriptional control of the lacZ promoter is under directional and diversifying selection;". bioRxiv, Mar. 18, 2022, pp. 1-51. (Year: 2022).

Alel-v2_NEB catalogue, one page down-loaded Apr. 12, 2024 (Year: 2024).

(56) References Cited

OTHER PUBLICATIONS

BamHI_NEB catalogue, one page down-loaded Apr. 12, 2024. (Year: 2024).

EcoRV_NEB catalogue, one page down-loaded Apr. 12, 2024. (Year: 2024).

Liu et al., A mutant spacer sequence between -35 and-10 elements makes the Plac promoter hyperactive and cAMP receptor protein-independent. PNAS., 2004, vol. 101(18): 6911-6916 (Year: 2004).

Mandecki et al., lac Up-Promoter mutants with increased homology to the consensus promoter sequence. J. Bacteriol., 1985, vol. 164(3): 1353-1355. (Year: 1985).

Mandecki et al., Mutants of the lac promoter with large insertions and deletions between the CAP binding site and the -35 region. Gene, 1984, vol. 31: 263-267 (Year: 1984).

Non-Final Office Action received for U.S. Appl. No. 16/914,266, mailed on Apr. 25, 2024, 32 pages.

Pmll_NEB catalogue, one page down-loaded Apr. 12, 2024. (Year: 2024).

Stefano et al., Spacer mutations in the lac pS promoter. PNAS., 1982, vol. 79: 1069-1072. (Year: 1982).

XhoI_NEB catalogue, one page down-loaded Apr. 12, 2024. (Year: 2024).

Final Office Action received for U.S. Appl. No. 16/914,266, mailed on Sep. 10, 2024, 14 pages.

Non-Final Office Action received for U.S. Appl. No. 16/914,266, mailed on May 8, 2025, 13 pages.

* cited by examiner ved the ight of the the factors, the prepared vectors lack 1-2 bases

PROMOTER AND CARRIER COMPOSED OF SAME AND APPLICATION THEREOF

RELATED APPLICATIONS

This application is a continuation-in-part of International Application No. PCT/CN2018/122312, which designated the United States and was filed on Dec. 20, 2018, published in Chinese, which claims priority under 35 U.S.C. § 119 or 365 to CN application No. 201711490305.5, filed Dec. 30, 2017. The entire teachings of the above applications are incorporated herein by reference.

INCORPORATION BY REFERENCE OF MATERIAL IN ASCII TEXT FILE

This application incorporates by reference the Sequence Listing contained in the following ASCII text file:
a) File name: 58241001002_SEQUENCELISTING.txt; created Jun. 26, 2023, 13,105 Bytes in size.

TECHNICAL FIELD

The present application belongs to the field of genetic engineering, and relates to an improved promoter, a vector composed of the same and a use thereof, in particular, to an improved promoter, a vector with the improved promoter, a host cell with a T vector and uses thereof.

BACKGROUND

A polymerase chain reaction (PCR) technology is a major breakthrough in the fields of molecular biology and genetic engineering. After the PCR technology was developed, a technology for cloning PCR products into vectors (generally plasmids) has also been developed. Commonly-used and relatively simple cloning methods include TA cloning and blunt-end ligations. The PCR product amplified by *Thermus aquaticus* (Taq) enzymes contains a dAMP tail which can be ligated to a vector containing a T-terminus (T vector) under the action of T4 ligases, and this is the TA cloning. High-fidelity DNA polymerases generally contain 3'-5' exonuclease activity, and the PCR products amplified by the high-fidelity DNA polymerases are blunt ends. These fragments are ligated to blunt-end vectors under the action of T4 ligases, which are the blunt-end ligations. These two methods have a common feature that the PCR products do not need to be treated in advance with special enzymes but are directly ligated to the vectors, which is simple and easily operated.

At present, commercially available T vectors and vectors that can be used for blunt-end cloning are generally based on the principle of blue-white screening. The blue-white screening is the most commonly used screening scheme to separate empty vectors from vectors with inserts. In this method, a reporter gene LacZα is used as a marker gene for the blue-white screening. However, vectors based on the principle of blue-white screening have the following problems during cloning: (1) due to the use of a strong promoter, the transcription and translation of foreign genes can be initiated in large quantities, which causes transcription or translation products of some foreign genes with complex structures to be toxic to hosts and cannot be cloned; (2) due to residual exonuclease activity of restriction enzymes when vectors are digested, repeated freezing and thawing of the digested vectors, long-term storage of digested linearized vectors and other factors, the prepared vectors lack 1-2 bases at digestion sites, leading to frameshift mutation of a LacZα gene, so that a clone without a foreign gene becomes white due to the frameshift mutation of the LacZα gene, resulting in a large number of false positive clones; (3) when a small foreign DNA fragment is cloned and a reading frame of the lacZα gene is not changed by inserting the foreign DNA, a false negative phenomenon that a plate is rich in blue spots will be caused; (4) when a foreign DNA fragment larger than 2 kb is cloned with a blunt-end vector, a few white spots and many blue spots are present, and the few white spots might grow together with the blue spots, so that white single clones are few, and it is difficult to select a sufficient number of positive clones. In addition, the blue-white screening further requires expensive and toxic chemical substances such as X-gal and IPTG.

The use of the ccdB lethal gene for constructing a zero background vector in order to clone blunt-end PCR Products. Hu L-L, Zhang S-S, Li X-X, Wang B-L. Molecular Biology. 2010; 44 (1):161-4. and Lethal ccdB gene-based zero-background vector for construction of shotgun libraries. Miyazaki K. Journal of bioscience and bioengineering. 2010 September; 110(3):372-3. have disclosed a use of the lethal ccdB gene for constructing a vector that does not require the blue-white screening, which has significant results and is easy and convenient for screening.

CN105400809A has disclosed a cloning vector and preparation and a use thereof, which disclosed a cloning vector pUC57-ccdB, which is a modified vector inserted with a ccdB gene at a multiple cloning site of a pUC57 vector. The ccdB gene contains blunt-end restriction enzyme recognition sites. With the lethal effect of ccdB proteins on *Escherichia coli* without an F plasmid, the ccdB (containing restriction enzyme Sma I sites) gene was inserted into the pUC57 plasmid by molecular biology techniques to obtain the vector pUC57-ccdB. Blunt ends are generated through Sma I digestion and ligated to genes to be cloned, so as to insert the genes to be cloned and avoid colonies containing empty vectors. However, the above technical solution still has some problems: (1) due to the use of the strong promoter, the transcription and translation of foreign genes can be initiated in large quantities, which causes transcription or translation products of some foreign genes with complex structures to be toxic to hosts and cannot be cloned; (2) due to repeated freezing and thawing and other factors, the T vector lacks 1-2 bases at the end, leading to frameshift mutation of the lethal ccdB gene, so that a clone without a foreign gene "survives" due to the frameshift mutation of the lethal ccdB gene, resulting in a large number of false positive clones; (3) when a small foreign DNA fragment is cloned and a reading frame of the lethal ccdB gene is not changed by inserting the foreign DNA, a false negative phenomenon that a plate includes no colonies will be caused.

Any DNA sequence that can be independently bound to a transcription factor and initiate transcription may be referred to as a promoter. A region recognizable by a σ factor in the promoter has very conserved sequence characteristics. Two sequences (referred to as −10 region and −35 region) about 10 nt and 35 nt upstream of a transcription starting site (+1) have a decisive effect on the recognition of the σ factor, so these two sequences are referred to as narrow promoters or core promoters. Other than the core promoters, sequences upstream of −35 region might also have an effect on transcription strength. These sequences are referred to as UP elements.

It is a key difficulty to modify the promoter to improve screening efficiency and avoid false positives and false negatives during screening.

SUMMARY

Therefore, the present application provides an improved promoter, a vector composed of the same and a use thereof, so as to solve the problems that a prepared T vector fails in cloning, or a large number of false positive or negative clones are produced in the existing art.

To achieve the object, the present application adopts technical solutions described below.

In a first aspect, the present application provides an improved promoter. The improved promoter is obtained by mutating a nucleic acid sequence between −35 region and −10 region in a promoter region into recognition sites for an endonuclease.

In the present application, a change in the number of nucleic acids between −35 region and −10 region in a prokaryote will affect a level of gene transcription activity. The nucleic acid sequence between −35 region and −10 region in the promoter region is mutated to be recognized by the endonuclease. During cloning, a vector is prepared as a linearized vector, and then a foreign gene is ligated to the linearized vector, so that an expression-regulating gene of the promoter has decreased activity and a reduced expression amount, and then functions.

In the present application, a mutation between −35 region and −10 region can avoid false positives and false negatives, avoid the deficiency that frameshift mutation of a gene due to a lack of 1-2 bp of the vector at digestion sites results in false positive clones, and eliminate a false negative phenomenon that a plate is rich in blue spots due to a small fragment of foreign DNA and a reading frame of the gene which is unchanged by inserting the foreign DNA.

The recognition sites for the endonuclease refer to sites recognizable by any endonuclease, and the endonuclease is not limited and is selected mainly based on the convenience of experimental operations of those skilled in the art, as long as a successful mutation can be achieved by mutating one or several bases.

According to the present application, the improved promoter is obtained by mutating a nucleic acid sequence between −35 region and −10 region in a promoter region of a β-galactosidase into the recognition sites for the endonuclease.

In the present application, for a promoter of the β-galactosidase, the nucleic acid sequence between −35 region and −10 region in a strong promoter region is mutated into the recognition sites for the endonuclease that can be recognized, but it is cleaved into the linearized vector and inserted with a foreign fragment, so that a strong promoter of the β-galactosidase has significantly decreased activity due to the insertion of a foreign DNA fragment, and an expression amount of the gene is significantly reduced, thereby overcoming the problem that a strong promoter in a vector based on blue-white screening initiates the transcription or translation of foreign genes and a transcription or translation product might be toxic to a host and cannot be cloned, avoiding the deficiency that frameshift mutation of the gene due to a lack of 1-2 bp of the vector at digestion sites results in false positive clones, and eliminating a false negative phenomenon of a plate due to a small fragment of foreign DNA and a reading frame of the gene which is unchanged by inserting the foreign DNA.

According to the present application, the nucleic acid sequence between −35 region and −10 region in the promoter region of the B-galactosidase is shown by SEQ ID NOs.: 1-2, where nucleic acid sequences shown by SEQ ID NOs.: 1-2 are as follows:

SEQ ID NO. 1:
5'-TTTACACTTTATGCTTCCGGCTCGTATGTT-3';

SEQ ID NO. 2:
5'-CTTTATGCTTCCGGCTCG-3'.

In the present application, an RNA polymerase II is generally bound at sites from −35 region to −10 region which are very important. An RNA polymerase can be in contact with a base in −35 and −10 sequences and a phosphate group in a primary DNA strand. A promoter farther from a common sequence has lower activity. The applicant has found that the foreign gene can be inserted by mutating a sequence from −35 region to −10 region, especially the sequence shown by SEQ ID NO: 2, so as to significantly reduce an expression amount of a lacZα gene.

According to the present application, the endonuclease may be selected by those skilled in the art as required, and different recognition sites for the endonuclease may be selected according to different sequences to be mutated in the promoter region. In the present application, the endonuclease is selected from, but is not limited to, any one or a combination of at least two of EcoRV, AleI, BamHI, XhoI and PmlI.

According to the present application, a nucleic acid sequence between −35 region and −10 region of the improved promoter is shown by SEQ ID NOs.: 3-10, where nucleic acid sequences shown by SEQ ID NOs.: 3-10 are as follows:

SEQ ID NO. 3:
5'-GATATCGCTTCCGGCTCG-3';

SEQ ID NO. 4:
5'-CTTGATATCTCCGGCTCG-3';

SEQ ID NO. 5:
5'-CTTTATGATATCGGCTCG-3';

SEQ ID NO. 6:
5'-CTTTATGCTGATATCTCG-3';

SEQ ID NO. 7:
5'-CACGTGGCTTCCGGCTCG-3';

SEQ ID NO. 8:
5'-CTTCACGTGTCCGGCTCG-3';

SEQ ID NO. 9:
5'-CTTTATCACGTGGGCTCG-3';

SEQ ID NO. 10:
5'-CTTTATGCTCACGTGTCG-3'.

In a second aspect, the present application provides a cloning vector including the improved promoter described in the first aspect.

According to the present application, a lacZα gene on the vector is replaced with a gene toxic to a host, where the gene toxic to the host is a gene whose transcription or translation product is capable of causing the host to fail to grow or proliferate.

According to the present application, the gene toxic to the host is a lethal gene and/or a restriction enzyme gene.

According to the present application, the lethal gene is a ccdB gene, where a nucleic acid sequence of the ccdB gene is shown by SEQ ID NO: 11.

In the present application, those skilled in the art may select the vector according to requirements. The selection of the vector will not affect a function of the promoter. The cloning vector is used for cloning a protein of interest. The cloning vector may be, for example, a high-copy cloning vector pUC18, pUC19 and pUC57, a low-copy cloning vector pCA, pCK and pCC or a single-copy cloning vector pCC1, each of which may carry the promoter of the present application, so as to carry out subsequent experiments without affecting the vector itself. The vector carrying the promoter of the present application is still a high-copy cloning vector, a low-copy cloning vector or a single-copy cloning vector.

According to the present application, the vector further includes a foreign gene operably ligated to the vector.

Optionally, the foreign gene is a lacI expression element, where a nucleic acid sequence of the lacI expression element is shown by SEQ ID NO: 12.

In a third aspect, the present application provides a T vector. The T vector is obtained by linearizing the vector described in the second aspect and adding one dideoxythymidine nucleotide to a 3' end of the linearized vector.

In a fourth aspect, the present application provides a recombinant vector obtained by inserting a foreign gene into the T vector described in the third aspect.

According to the present application, the foreign gene is operably ligated between recognition sites for an endonuclease of an improved promoter.

In a fifth aspect, the present application provides a method for preparing the T vector described in the third aspect. The method includes steps described below.

(1) A lacZα gene on a vector is replaced with a gene toxic to a host.
(2) A primer is designed according to recognition sites for an endonuclease to be mutated into, and an original promoter and an expression-regulating gene of the original promoter are used as a template for PCR amplification, to obtain a product with an improved promoter.
(3) The product in step (2) is cyclized by a Gibson recombination method to obtain a vector with the promoter.
(4) The vector in step (3) is linearized, and one dideoxythymidine nucleotide is added to a 3' end of the linearized vector, to obtain the T vector.

According to the present application, a nucleic acid sequence of the primer in step (2) is shown by SEQ ID NOs.: 13-28.

In the present application, in a plasmid constructed by performing PCR amplification on PUC57-lacZ or pCK-lacZ with a primer pair of nucleic acid sequences shown by SEQ ID NOs.: 13-14, a nucleic acid sequence shown by SEQ ID NO: 2 is mutated into a nucleic acid sequence shown by SEQ ID NO: 3.

In a plasmid constructed by performing PCR amplification on pUC57-lacZ or pCK-lacZ with a primer pair of nucleic acid sequences shown by SEQ ID NOs.: 15-16, the nucleic acid sequence shown by SEQ ID NO: 2 is mutated into a nucleic acid sequence shown by SEQ ID NO: 4.

In a plasmid constructed by performing PCR amplification on pUC57-lacZ or pCK-lacZ with a primer pair of nucleic acid sequences shown by SEQ ID NOs.: 17-18, the nucleic acid sequence shown by SEQ ID NO: 2 is mutated into a nucleic acid sequence shown by SEQ ID NO: 5.

In a plasmid constructed by performing PCR amplification on pUC57-lacZ or pCK-lacZ with a primer pair of nucleic acid sequences shown by SEQ ID NOs.: 19-20, the nucleic acid sequence shown by SEQ ID NO: 2 is mutated into a nucleic acid sequence shown by SEQ ID NO: 6.

In a plasmid constructed by performing PCR amplification on pCC1-lacZ with a primer pair of nucleic acid sequences shown by SEQ ID NOs.: 21-22, the nucleic acid sequence shown by SEQ ID NO: 2 is mutated into a nucleic acid sequence shown by SEQ ID NO: 7.

In a plasmid constructed by performing PCR amplification on pCC1-lacZ with a primer pair of nucleic acid sequences shown by SEQ ID NOs.: 23-24, the nucleic acid sequence shown by SEQ ID NO: 2 is mutated into a nucleic acid sequence shown by SEQ ID NO: 8.

In a plasmid constructed by performing PCR amplification on pCC1-lacZ with a primer pair of nucleic acid sequences shown by SEQ ID NOs.: 25-26, the nucleic acid sequence shown by SEQ ID NO: 2 is mutated into a nucleic acid sequence shown by SEQ ID NO: 9.

In a plasmid constructed by performing PCR amplification on pCC1-lacZ with a primer pair of nucleic acid sequences shown by SEQ ID NOs.: 27-28, the nucleic acid sequence shown by SEQ ID NO: 2 is mutated into a nucleic acid sequence shown by SEQ ID NO: 10.

According to the present application, the linearizing in step (4) is performed through endonuclease digestion and/or the PCR amplification.

According to the present application, the adding one dideoxythymidine nucleotide in step (4) is performed with a terminal transferase and/or a Taq DNA polymerase.

According to the present application, before step (1), the method further includes performing codon optimization on the gene toxic to the host.

According to the present application, after step (1), the method further includes inserting a foreign gene into the vector.

In a sixth aspect, the present application provides a host cell, including the cloning vector described in the second aspect and/or the recombinant vector described in the fourth aspect.

According to the present application, the host cell is wild *Escherichia coli*.

In a seventh aspect, the present application provides a gene cloning method. The method includes steps described below.

1 A base is added to a 3' end of a foreign gene, the foreign gene added with the A base is ligated to the T vector described in the third aspect to be introduced into a host cell, and the host cell is cultivated under appropriate conditions, to obtain a positive clone.

According to the present application, the host cell is wild *Escherichia coli*.

In an eighth aspect, the present application provides a kit, including any one or a combination of at least two of the improved promoter described in the first aspect, the cloning vector described in the second aspect, the T vector described in the third aspect, the recombinant vector described in the fourth aspect and the host cell described in the fifth aspect.

According to the present application, the kit is used for gene cloning.

Compared with the existing art, the present application has beneficial effects described below.

(1) In the present application, a lacZα gene of a backbone vector is replaced with the gene toxic to the host, and digestion sites are provided between −10 region and −35 region in a strong promoter region of the β-galactosidase that initiates an expression of the lacZα gene; during cloning, a vector is digested with an appropriate endonuclease or the linearized vector is prepared by a PCR method, and then the foreign gene is ligated to the linearized vector, so that the insertion of a foreign DNA fragment between −10 region and −35 regions of the promoter of the B-galactosidase results in extremely low activity of the promoter of the β-galactosidase even when induced by IPTG and an extremely small expression amount of the gene toxic to the host. In this way, a host of the recombinant vector containing the foreign DNA fragment can grow normally. However, an empty vector that is self-ligated due to the non-ligation of the foreign DNA fragment, an original vector left after digestion or a template vector used for the PCR amplification, due to strong activity of its strong promoter, can initiate the expression in large quantities of the gene toxic to the host, so that a host carrying the original vector containing no foreign DNA fragment cannot grow. It is very simple to select positive clones and very convenient for blunt-end cloning of a large foreign DNA fragment.

(2) The vector of the present application can not only overcome the problem that a strong promoter of a screening gene in the vector initiates the transcription or translation of foreign genes and the transcription or translation product might be toxic to the host and cannot be cloned, but also avoid false positive clones due to the frameshift mutation of the screening gene and the false negative phenomenon caused when the small fragment of foreign DNA is cloned and the reading frame of the screening gene is not changed by inserting the foreign DNA.

(3) The vector of the present application may further include the lacI expression element. When the vector transforms *Escherichia coli* competent cells in the absence of IPTG, the activity of the promoter of the β-galactosidase is inhibited to a large degree due to the constitutive expression of lacI of the vector, and an expression amount of a screening marker gene toxic to a host regulated by the promoter is extremely low, so that the *Escherichia coli* containing the vector can grow normally. Therefore, it is extremely easy to prepare the vector.

(4) A method for constructing the vector of the present application is simple and easy to operate, has high efficiency, and can construct the cloning vector in a short time.

(5) A use of the vector of the present application in the field of gene cloning: the T vector eliminates the transcription of the foreign gene initiated by the strong promoter, so that the large foreign DNA fragment is easy to be cloned.

DETAILED DESCRIPTION

Figure 1:
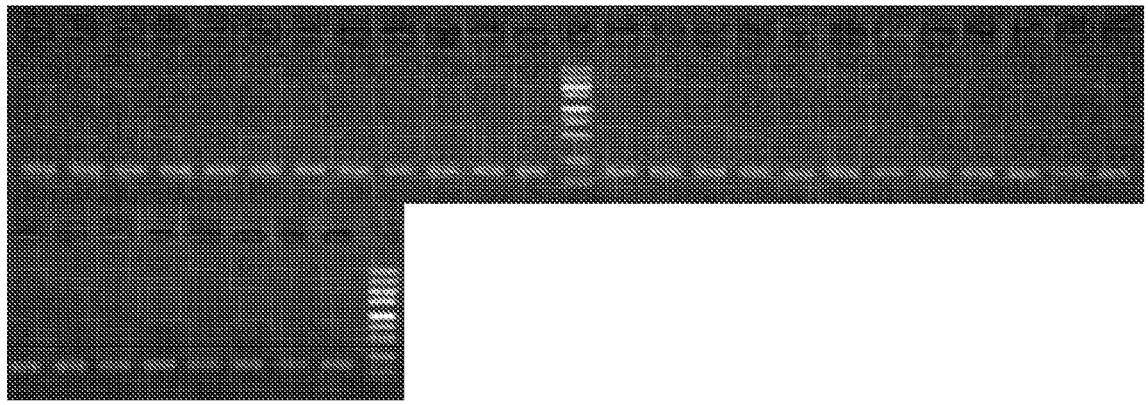
FIG. 1 is an electrophoresis diagram of colony PCR identification in Example 1 of the present application, where a size of a DNA marker is 0.1 kb, 0.25 kb, 0.5 kb, 0.75 kb, 1 kb, 1.5 kb, 2 kb, 3 kb and 5 kb.

To further elaborate on the technical means adopted and the effects achieved in the present application, the technical solutions of the present application are further described below through specific embodiments, but the present application is not limited to the scope of the embodiments.

The present application adopts conventional techniques and methods in the fields of genetic engineering and molecular biology, and general reference literature provides definitions and methods known to those skilled in the art. However, those skilled in the art may adopt other conventional methods, experimental schemes and reagents in the art on the basis of the technical solutions described in the present application without being limited by specific examples of the present application.

Experiments without specific techniques or conditions noted in the examples are conducted according to techniques or conditions described in the literature in the art or a product specification. The reagents or instruments used without manufacturers are conventional products commercially available through proper channels.

Explanation of Terms:

LacZ gene: a gene widely used in gene expression regulation researches. An encoded β-galactosidase (β-gal) is a tetramer composed of 4 subunits and can catalyze a hydrolysis of lactose. The β-gal is relatively stable, appears blue when stained with X-Gal as a substrate, and is easy to detect and observe. Many advantages of the LacZ gene make it a commonly-used marker gene in genetic engineering experiments such as screening of transformed strains and β-galactosidase color test method, that is, blue-white screening.

LacZα gene: an N-terminal α-fragment for encoding the β-galactosidase (lacZ). The β-galactosidase with enzymatic activity may be formed through α-complementation and cleave a colorless compound, X-gal(5-bromo-4-chloro-3-indole-β-D-galactoside), into galactose and a dark blue substance, 5-bromo-4-indigo.

Endonuclease: an enzyme that can hydrolyze a phosphodiester bond inside a molecular chain to generate oligonucleotides among nucleic acid hydrolases.

PCR technology: a polymerase chain reaction, in which DNA is denatured in vitro at a high temperature of 95° C. to be single-stranded, a primer combines with a single strand at a low temperature (generally about 60° C.) based on a principle of complementary base pairing, the temperature is adjusted to an optimal reaction temperature of a DNA polymerase (about 72° C.) at which the DNA polymerase synthesizes a complementary strand along a direction from phosphate to five-carbon sugar (5'-3'). A PCR instrument based on polymerases is in fact a temperature control device and can control the temperature well between a denaturation temperature, a renaturation temperature and an extension temperature.

Materials:

| | |
|---|---|
| Kanamycin-resistant pUC57 plasmid | Genewiz Inc. Suzhou |
| pCK plasmid | Genewiz Inc. Suzhou |
| Chloramphenicol-resistant pCC1TM plasmid | EPICENTRE |
| Top10F' competent cell | Invitrogen |
| Restriction enzymes: EcoRV, AleI | NEB |
| T4 DNA ligase | NEB |
| lambdaDNA | NEB |
| Gibson Assembly ® Master Mix kit | NEB |
| Primer synthesis | Genewiz Inc. Suzhou |

Example 1 Construction and Function Verification of a High-Copy Cloning Vector

This example provides a method for constructing the high-copy cloning vector, which includes specific steps described below.

(I) The lacZα gene of pUC57 (kanamycin resistance) was replaced with a ccdB gene, specifically including steps described below.

(1) The ccdB gene was synthesized (by Genewiz Inc. Suzhou) through a full gene synthesis, and its nucleotide sequence is shown by SEQ ID NO: 11:

ATGCAGTTTAAGGTTTACACCTATAAAAGAGAGAGCCGTTATCGTCTGTT

TGTGGATGTACAGAGTGATATTATTGACACGCCCGGGCGACGGATGGTGA

TCCCCCTGGCCAGTGCACGTCTGCTGTCAGATAAAGTCTCCCGTGAACTT

TACCCGGTGGTGCATATCGGGGATGAAAGCTGGCGCATGATGACCACCGA

TATGGCCAGTGTGCCGGTCTCCGTTATCGGGGAAGAAGTGGCTGATCTCA

GCCACCGCGAAAATGACATCAAAAACGCCATTAACCTGATGTTCTGGGGA

ATATAA.

(2) The kanamycin-resistant pUC57 plasmid was used as a template and SEQ ID NOs.: 29-30 were used as primers for PCR amplification. Specific sequences are as follows:

(forward primer):
                                                   SEQ ID NO. 29
TTATAGGTGTAAACCTTAAACTGCATAGCTGTTTCCTGTGTGAAATTGTT

ATCC;

(reverse primer):
                                                   SEQ ID NO. 30
ATTAACCTGATGTTCTGGGGAATATAATTAAGCCAGCCCCGACACCCGCC

AACAC.

A PCR system is shown in Table 1.

TABLE 1

| Template | About 50 ng, 0.5 μL |
| --- | --- |
| Forward primer | 10 pM, 0.5 μL |
| Reverse primer | 10 pM, 0.5 μL |
| dNTP | 5 mM each, 0.5 μL |
| 5 × PCR buffer | 10 μL |
| pfu DNA polymerase | 5 U/μL, 0.5 μL |
| H₂O | 37.5 μL |

One group uses water as a sample for negative control. Reaction conditions are listed in Table 2.

TABLE 2

| | Reaction Program | Number of Cycles |
| --- | --- | --- |
| Amplification program | 95° C. 4 min | 1 |
| | 94° C. 30 s | 25 |
| | 58° C. 30 s | |
| | 72° C. 2 min | |
| | 72° C. 5 min | 1 |
| | 4° C. | 1 |

(3) A PCR solution obtained in step (2) was subjected to 1% agarose gel electrophoresis, and gel was cut, recovered and purified to obtain a PCR amplification product.

(4) The Gibson Assembly® Master Mix kit was used for ligating a PCR purified product obtained in step (3) and the ccdB gene. A ligation system is shown in Table 3.

TABLE 3

| PCR amplification product | About 200 ng, 5 μL |
| --- | --- |
| ccdB gene | About 120 ng, 5 μL |
| Gibson Assembly ® Master Mix | 10 μL |
| Sterilized and deionized H₂O | 0 μL |

A ligation condition was a ligation reaction of 1 h at 50° C.

(5) A ligation product obtained in step (4) was transformed into Top10F' competent cells which were finally coated with a kanamycin-resistant LB plate and cultivated overnight at 37° C. A single clone was picked and subjected to Sanger sequencing on the next day, and a plasmid with a correct sequence was reserved and named pUC57-ccdB.

(II) An expressible lacI element was inserted into the pUC57-ccdB plasmid, specifically including steps described below.

(1) The pUC57-ccdB plasmid successfully constructed in step (I) was used as a template, and primers F-vector-Insert and R-vector-Insert (SEQ ID NOs.: 31-32) were used as primers for the PCR amplification.

(forward primer):
                                                   SEQ ID NO. 31
CAGCTGCATTAATGAATCGGCCAACGCGC;

(reverse primer):
                                                   SEQ ID NO. 32
GCACGACAGGTTTCCCGACTGGAAAGCGG.

A PCR system is shown in Table 1, and reaction conditions are listed in Table 2.

(2) A PCR solution obtained in step (1) was subjected to 1% agarose gel electrophoresis, and gel was cut, recovered and purified to obtain a PCR amplification product.

(3) A lacI expression element was synthesized (by Genewiz Inc. Suzhou) through a gene synthesis, and its nucleotide sequence is shown by SEQ ID NO: 12:

CCCGCTTTCCAGTCGGGAAACCTGTCGTGCTTGACACCATCGAATGGTGC

AAAACCTTTCGCGGTATGGCATGATAGCGCCCGGAAGAGAGTCAATTCAG

GGTGGTGAATATGAACGTGAAACCAGTAACGTTATACGATGTCGCAGAGT

ATGCCGGTGTCTCTTATCAGACCGTTTCCCGCGTGGTGAACCAGGCCAGC

CACGTTTCTGCGAAAACGCGGGAAAAAGTGGAAGCGGCGATGGCGGAGCT

GAATTACATTCCCAACCGCGTGGCACAACAACTGGCGGGCAAACAGTCGT

TGCTGATTGGCGTTGCCACCTCCAGTCTGGCCCTGCACGCGCCGTCGCAA

ATTGTCGCGGCGATTAAATCTCGCGCCGATCAACTGGGTGCCAGCGTGGT

GGTGTCGATGGTAGAACGAAGCGGCGTCGAAGCCTGTAAAGCGGCGGTGC

ACAATCTTCTCGCGCAACGCGTCAGTGGGCTGATCATTAACTATCCGCTG

GATGACCAGGATGCCATTGCTGTGGAAGCTGCCTGCACTAATGTTCCGGC

GTTATTTCTTGATGTCTCTGACCAGACACCCATCAACAGTATTATTTTCT

CCCATGAAGACGGTACGCGACTGGGCGTGGAGCATCTGGTCGCATTGGGT

CACCAGCAAATCGCGCTGTTAGCGGGCCCATTAAGTTCTGTCTCGGCGCG

TCTGCGTCTGGCTGGCTGGCATAAATATCTCACTCGCAATCAAATTCAGC

-continued

CGATAGCGGAACGGGAAGGCGACTGGAGTGCCATGTCCGGTTTTCAACAA

ACCATGCAAATGCTGAATGAGGGCATCGTTCCCACTGCGATGCTGGTTGC

CAACGATCAGATGGCGCTGGGCGCAATGCGCGCCATTACCGAGTCCGGGC

TGCGCGTTGGTGCGGATATCTCGGTAGTGGGATACGACGATACCGAAGAC

AGCTCATGTTATATCCCGCCGTTAACCACCATCAAACAGGATTTTCGCCT

GCTGGGGCAAACCAGCGTGGACCGCTTGCTGCAACTCTCTCAGGGCCAGG

CGGTGAAGGGCAATCAGCTGTTGCCCGTCTCACTGGTGAAAAGAAAAACC

ACCCTGGCGCCCAATACGCAAACCGCCTCTCCCCGCGCGTTGGCCGATTC

ATTAATGCAGCTGGCACGACAGGTTTCCCGACTGGAAAGCGGGCAGTGAT

GCCTGGCGGCAGTAGCGCGGTGGTCCCACCTGACCCCATGCCGAACTCAG

AAGTGAAACGCCGTAGCGCCGATGGTAGTGTGGGGTCTCCCCATGCGAGA

GTAGGGAACTGCCAGGCATCAAATAAAACGAAAGGCTCAGTCGAAAGACT

GGGCCTTGGATTGCACGCAGGTTCTCCGGCCGCTTGGGTGGAGAGGCGCA

GAAAGTCAAAAGCCTCCGACCGGAGGCTTTTGACTATTAGCACAGCTGCA

TTAATGAATCGGCCAACGCGCG.

(4) The Gibson Assembly® Master Mix (NEB) kit was used for ligating a PCR purified product obtained in step (2) and the lacI expression element obtained through the gene synthesis in step (3). A ligation system is shown in Table 4.

TABLE 4

| | |
|---|---|
| PCR amplification product | About 270 ng, 5 μL |
| lacI expression element | About 150 ng, 5 μL |
| Gibson Assembly ® Master Mix | 10 μL |
| Sterilized and deionized H$_2$O | 0 μL |

A ligation condition was a ligation reaction of 1 h at 50° C.

(5) A ligation product obtained in step (4) was transformed into Top10F' competent cells which were finally coated with the kanamycin-resistant LB plate and cultivated overnight at 37° C. A single clone was picked and subjected to Sanger sequencing on the next day, and a plasmid with a correct sequence was reserved and named pUC57-ccdB-lacI.

(III) A sequence, 5'-CTTTATGCTTCCGGCTCG-3' (SEQ ID NO: 2), between −35 region and −10 region in a promoter region of the β-galactosidase of the pUC57-ccdB-lacI plasmid was mutated into a sequence that can be digested by the endonuclease to form blunt ends, which specifically includes steps described below.

(1) The pUC57-ccdB-lacI plasmid successfully constructed in step (II) was used as a template, and primers F1-EcoRV, R1-EcoRV, F2-EcoRV, R2-EcoRV, F3-EcoRV, R3-EcoRV, F4-EcoRV and R4-EcoRV (SEQ ID NO: 13-SEQ ID NO: 20) were used as primers for the PCR amplification. Specific sequences are listed in Table 5.

TABLE 5

| No. | Sequence |
|---|---|
| SEQ ID NO. 13 (F1-EcoRV) | CCGGAAGCGATATCTGTAAAGCCTGGGGTGCCTAA TGAGTG |
| SEQ ID NO. 14 (R1-EcoRV) | CCCCAGGCTTTACAGATATCGCTTCCGGCTCGTAT GTTGTGTGGAATT |
| SEQ ID NO. 15 (F2-EcoRV) | GAGCCGGAGATATCAAGTGTAAAGCCTGGGGTGCC TAATGAG |
| SEQ ID NO. 16 (R2-EcoRV) | CAGGCTTTACACTTGATATCTCCGGCTCGTATGTT GTGTGGAATTGTG |
| SEQ ID NO. 17 (F3-EcoRV) | TACGAGCCGATATCATAAAGTGTAAAGCCTGGGGT GCCTAAT |
| SEQ ID NO. 18 (R3-EcoRV) | GCTTTACACTTTATGATATCGGCTCGTATGTTGTG TGGAATTGTGAGC |
| SEQ ID NO. 19 (F4-EcoRV) | ACATACGAGATATCAGCATAAAGTGTAAAGCCTGG GGTGCCT |
| SEQ ID NO. 20 (R4-EcoRV) | TTACACTTTATGCTGATATCTCGTATGTTGTGTGG AATTGTGAGCGGA |

A specific PCR system is shown in Table 1, and reaction conditions are listed in Table 2.

(2) A PCR solution obtained in step (1) was subjected to 1% agarose gel electrophoresis, and gel was cut, recovered and purified to obtain a PCR amplification product. The Gibson Assembly® Master Mix kit was used for a ligation reaction. A ligation system is shown in Table 6.

TABLE 6

| | |
|---|---|
| PCR amplification product | About 300 ng, 10 μL |
| Gibson Assembly ® Master Mix | 10 μL |
| Sterilized and deionized H$_2$O | 0 μL |

A ligation condition was a ligation reaction of 1 h at 50° C.

(3) Each ligation product obtained in step (2) was transformed into Top10F' competent cells which were finally coated with the kanamycin-resistant LB plate and cultivated overnight at 37° C. A single clone was picked and subjected to Sanger sequencing on the next day, and a plasmid with a correct sequence was reserved and separately named pUC57-ccdB-lacI-Mu-1 (5'-CTTTATGCTTCCGGCTCG-3' (SEQ ID NO: 2) was mutated into 5'-GATATCGCTTCCGGCTCG-3' (SEQ ID NO: 3), and the plasmid was constructed with primers F1-EcoRV+R1-EcoRV), pUC57-ccdB-lacI-Mu-2 (5'-CTTTATGCTTCCGGCTCG-3' (SEQ ID NO: 2) was mutated into 5'-CTTGATATCTCCGGCTCG-3' (SEQ ID NO: 4), and the plasmid was constructed with primers F2-EcoRV+R2-EcoRV), pUC57-ccdB-lacI-Mu-3 (5'-CTTTATGCTTCCGGCTCG-3' (SEQ ID NO: 2) was mutated into 5'-CTTTATGATATCGGCTCG-3' (SEQ ID NO: 5), and the plasmid was constructed with primers F3-EcoRV+R3-EcoRV), and pUC57-ccdB-lacI-Mu-4 (5'-CTTTATGCTTCCGGCTCG-3' (SEQ ID NO: 2) was mutated into 5'-CTTTATGCTGATATCTCG-3' (SEQ ID NO: 6), and the plasmid was constructed with primers F4-EcoRV+R4-EcoRV).

(IV) Vector cloning experiments
(1) The correct plasmids pUC57-ccdB-lacI-Mu-1, pUC57-ccdB-lacI-Mu-2, pUC57-ccdB-lacI-Mu-3 and pUC57-ccdB-lacI-Mu-4 constructed in step (III) were digested with a restriction enzyme EcoRV. Digestion products were subjected to 1% agarose gel electrophoresis, and gel was cut, recovered and purified.

(2) Two strands of primers of 24 bp and 48 bp were synthesized and annealed to form double-stranded DNA. Nucleotide sequences of the reversely complementary primers of 24 bp and 48 bp are shown by SEQ ID NO: 33-SEQ ID NO: 36, specifically:

SEQ ID NO. 33:
TTCATACAGCAGGCTATGTTTAGG;

SEQ ID NO. 34:
CCTAAACATAGCCTGCTGTATGAA;

SEQ ID NO. 35:
TAAGCCGATACTGTATTTTTTATCCATAGCTGTTTCCTGTGTGAAATT;

SEQ ID NO. 36:
AATTTCACACAGGAAACAGCTATGGATAAAAAATACAGTATCGGCTTA.

(3) λ DNA was used as a template, and F-λDNA-200 bp+R-λDNA-200 bp were used as primers for the PCR amplification. Nucleotide sequences of the primers F-λDNA-200 bp and R-λDNA-200 bp are shown by SEQ ID NO:37-SEQ ID NO:38, specifically:

(F-λDNA-200 bp):
SEQ ID NO. 37
GTTGAATGGGCGGATGCTAATTACTATCTCCCG;

(R-λDNA-200 bp):
SEQ ID NO. 38
TTATGCTCTATAAAGTAGGCATAAACACCCAGC.

A PCR system is shown in Table 1, and a PCR amplification program is shown in Table 7.

TABLE 7

| | Reaction Program | Number of Cycles |
|---|---|---|
| Amplification program | 95° C. 4 min | 1 |
| | 94° C. 30 s | 25 |
| | 58° C. 30 s | |
| | 72° C. 15 s | |
| | 72° C. 3 min | 1 |
| | 4° C. | 1 |

(4) A PCR solution obtained in step (3) was subjected to 1% agarose gel electrophoresis, and gel was cut, recovered and purified to obtain a PCR amplification product.

(5) Fragments of 24 bp and 48 bp formed after annealing in step (2) and a PCR product purified in step (4) were ligated to the prepared vectors in step (1), pUC57-ccdB-lacI-Mu-1, pUC57-ccdB-lacI-Mu-2, pUC57-ccdB-lacI-Mu-3 and pUC57-ccdB-lacI-Mu-4, separately. A ligation system is shown in Table 8.

TABLE 8

| Foreign DNA | About 90 ng, 3 μL |
|---|---|
| Digested vector | About 30 ng, 1 μL |
| 10 × buffer | 1 μL |
| T4 DNA ligase | 1 μL |
| Sterilized and deionized H$_2$O | 4 μL |

A ligation condition was a ligation reaction of 1 h at 22° C.

(6) Each ligation product obtained in step (5) was transformed into Top10F' competent cells which were finally coated with the kanamycin-resistant LB plate and cultivated overnight at 37° C. 12 single clones were picked on each plate of the cloned DNA fragment of about 200 bp for colony PCR identification on the next day. The PCR system is shown in Table 9.

TABLE 9

| PCR system | |
|---|---|
| Bacterium solution template | 3 μL |
| F-λDNA-200 bp | 10 pM, 0.5, μL |
| R-λDNA-200 bp | 10 pM, 0.5 μL |
| dNTP | 5 mM each, 0.5 μL |
| 10 × Taq buffer | 5 μL |
| Taq DNA polymerase | 5 U/μL, 0.5 μL |
| H$_2$O | 40 μL |

A PCR amplification program is shown in Table 10.

TABLE 10

| | Reaction Program | Number of Cycles |
|---|---|---|
| Amplification program | 95° C. 6 min | 1 |
| | 94° C. 30 s | 25 |
| | 58° C. 30 s | |
| | 72° C. 15 s | |
| | 72° C. 3 min | 1 |
| | 4° C. | 1 |

A PCR identification result is shown in FIG. 1. The result in FIG. 1 shows that all colonies are positive clones. 12 single clones separately selected from the plates of the cloned foreign DNA fragments of 24 bp and 48 bp and single clones that were positive after colony identification were subjected to Sanger sequencing. Sequencing results show that all clones have correct sequences. Experimental results show that the vector of the present application may be used for cloning foreign DNA of 24 bp or more.

Example 2 Experimental Verification of the Cloning Vector of the Present Application to Overcome False Positive Clones Three mutant plasmids of pUC57-ccdB-lacI-Mu-4 (pUC57-ccdB-lacI-Mu-4A, pUC57-ccdB-lacI-Mu-4B and pUC57-ccdB-lacI-Mu-4C) were constructed to simulate the self-ligation of the pUC57-ccdB-lacI-Mu-4 plasmid due to a lack of 1-2 bases at two ends of a digestion site after it is digested with EcoRV. Construction steps are described below.

(1) The plasmid pUC57-ccdB-lacI-Mu-4 constructed in Example 1 was used as a template, and F1-del+R1-del, F2-del+R2-del and F3-del+R3-del were used as primers for PCR amplification. Nucleotide sequences of the primers F1-del, R1-del, F2-del, R2-del, F3-del and R3-del are shown by SEQ ID NO: 39-SEQ ID NO: 44, specifically:

(F1-del):
SEQ ID NO. 39
ACAACATACGAGATTCAGCATAAAGTGTAAAGCCTGGGGTGC;

(R1-del):
SEQ ID NO. 40
CTTTATGCTGAATCTCGTATGTTGTGTGGAATTGTGAGC;

-continued (F2-del):
SEQ ID NO. 41
CACAACATACGAGAATCAGCATAAAGTGTAAAGCCTGGGGTG;

(R2-del):
SEQ ID NO. 42
CACTTTATGCTGATTCTCGTATGTTGTGTGGAATTGTGAGCG;

(F3-del):
SEQ ID NO. 43
ACACAACATACGAGATCAGCATAAAGTGTAAAGCCTGGGGTG;

(R3-del):
SEQ ID NO. 44
ACACTTTATGCTGATCTCGTATGTTGTGTGGAATTGTGAGCGG.

A PCR system is shown in Table 1 in Example 1, and a PCR amplification program is shown in Table 2 in Example 1.

(2) A PCR solution obtained in step (1) was subjected to 1% agarose gel electrophoresis, and gel was cut, recovered and purified to obtain a PCR amplification product. The Gibson Assembly® Master Mix (NEB) kit was used for a ligation reaction. A ligation system is shown in Table 6 in Example 1. A ligation condition was a ligation reaction of 1 h at 50° C.

(3) Each ligation product obtained in step (2) was transformed into Top10F' competent cells which were finally coated with the kanamycin-resistant LB plate and cultivated overnight at 37° C. 5 single clones were picked from each plate and subjected to Sanger sequencing on the next day, and plasmids with correct sequences were reserved. The three mutant plasmid of pUC57-ccdB-lacI-Mu-4 are named pUC57-ccdB-lacI-Mu-4A, pUC57-ccdB-lacI-Mu-4B and pUC57-ccdB-lacI-Mu-4C, separately. An EcoRV site of pUC57-ccdB-lacI-Mu-4A was mutated into GAATC, that is, the sequence was mutated from 5'-CTTTATGCTGA-TATCTCG-3' (SEQ ID NO: 6) to 5'-CTTTATGCT-GAATCTCG-3' (SEQ ID NO: 49). An EcoRV site of pUC57-ccdB-lacI-Mu-4B was mutated into GATTC, that is, the sequence was mutated from 5'-CTT-TATGCTGATATCTCG-3' (SEQ ID NO: 6) to 5'-CTT-TATGCTGATTCTCG-3' (SEQ ID NO: 50). An EcoRV site of pUC57-ccdB-lacI-Mu-4C was mutated into GATC, that is, the sequence was mutated from 5'-CTT-TATGCTGATATCTCG-3' (SEQ ID NO: 6) to 5'-CTT-TATGCTGATCTCG-3' (SEQ ID NO: 51).

(4) Correct plasmids pUC57-ccdB-lacI-Mu-4A, pUC57-ccdB-lacI-Mu-4B and pUC57-ccdB-lacI-Mu-4C in step (3) each were transformed into Top1OF' competent cells, and finally the recovered bacterium solutions each were equally divided into two parts which were coated with the kanamycin-resistant LB plate containing IPTG and the kanamycin-resistant LB plate containing no IPTG and cultivated overnight at 37° C. It was found on the next day that no colonies are formed on the plate containing IPTG, and colonies on the plate containing no IPTG are all normal in morphology and number.

Experimental results show that B-galactosidase promoters of the three mutant plasmids of pUC57-ccdB-lacI-Mu-4 (pUC57-ccdB-lacI-Mu-4A, pUC57-ccdB-lacI-Mu-4B and pUC57-ccdB-lacI-Mu-4C), when induced by IPTG, still have strong activity and can express ccdB in large quantities, so that colonies cannot grow, that is, the vector of the present application, when induced by IPTG, will not generate false positive clones in the case of the self-ligation for the lack of 1-2 bases at two ends of the site.

Example 3 Construction and Function Verification of a Low-Copy T Vector

This example provides a method for constructing the low-copy T vector, which includes steps described below.

(I) The lacZα gene of pCK (kanamycin resistance) was replaced with a ccdB gene, specifically including steps described below.
(1) The kanamycin-resistant pCK plasmid was used as a template and SEQ ID NOs.: 45-46 were used as primers for PCR amplification. Specific sequences are as follows:

(forward primer):
SEQ ID NO. 45
TTATAGGTGTAAACCTTAAACTGCATAGCTGTTTCCTGTGTGAAATTGT

TATCC;

(reverse primer):
SEQ ID NO. 46
TTAACCTGATGTTCTGGGGAATATAATTAAGCCAGCCCCGAGTAGCTAG

ACAGG.

A PCR system is shown in Table 1 in Example 1, and reaction conditions are shown in Table 2 in Example 1.
(2) A PCR solution obtained in step (1) was subjected to 1% agarose gel electrophoresis, and gel was cut, recovered and purified to obtain a PCR amplification product.
(3) The Gibson Assembly® Master Mix kit was used for ligating a PCR purified product obtained in step (2) and the ccdB gene obtained through a gene synthesis in step (1) in Example 1. A ligation system is shown in Table 3 in Example 1. A ligation condition was a ligation reaction of 1 h at 50° C.
(4) A ligation product obtained in step (3) was transformed into Top10F' competent cells which were finally coated with a kanamycin-resistant LB plate and cultivated overnight at 37° C. A single clone was picked and subjected to Sanger sequencing on the next day, and a plasmid with a correct sequence was reserved and named pCK-ccdB.

(II) A sequence, 5'-CTTTATGCTTCCGGCTCG-3' (SEQ ID NO: 2), between −35 region and −10 region in a promoter region of the B-galactosidase of the pCK-ccdB plasmid was mutated into a sequence recognizable by the endonuclease, which specifically includes steps described below.
(1) The pCK-ccdB plasmid successfully constructed in step (I) was used as a template, and primers F1-EcoRV, R1-EcoRV, F2-EcoRV, R2-EcoRV, F3-EcoRV, R3-EcoRV, F4-EcoRV and R4-EcoRV (SEQ ID NO: 13-SEQ ID NO: 20) were used as primers for the PCR amplification. Specific sequences are listed in Table 5 in Example 1. A specific PCR system is shown in Table 1 in Example 1, and reaction conditions are shown in Table 2 in Example 1.
(2) A PCR solution obtained in step (1) was subjected to 1% agarose gel electrophoresis, and gel was cut, recovered and purified to obtain a PCR amplification product. The Gibson Assembly® Master Mix kit was used for a ligation reaction. A ligation system is shown in Table 6 in Example 1. A ligation condition was a ligation reaction of 1 h at 50° C.

(3) Each ligation product obtained in step (2) was transformed into Top10F' competent cells which were finally coated with the kanamycin-resistant LB plate and cultivated overnight at 37° C. A single clone was picked and subjected to Sanger sequencing on the next day, and a plasmid with a correct sequence was reserved and separately named pCK-ccdB-Mu-1 (5'-CTTTATGCTTCCGGCTCG-3' (SEQ ID NO: 2) was mutated into 5'-GATATCGCTTCCGGCTCG-3' (SEQ ID NO: 3), and the plasmid was constructed with primers F1-EcoRV+R1-EcoRV), pCK-ccdB-Mu-2 (5'-CTTTATGCTTCCGGCTCG-3' (SEQ ID NO: 2) was mutated into 5'-CTTGATATCTCCGGCTCG-3' (SEQ ID NO: 4), and the plasmid was constructed with primers F2-EcoRV+R2-EcoRV), pCK-ccdB-Mu-3 (5'-CTTTATGCTTCCGGCTCG-3' (SEQ ID NO: 2) was mutated into 5'-CTTTATGATATCGGCTCG-3' (SEQ ID NO: 5), and the plasmid was constructed with primers F3-EcoRV+R3-EcoRV), and pCK-ccdB-Mu-4 (5'-CTTTATGCTTCCGGCTCG-3' (SEQ ID NO: 2) was mutated into 5'-CTTTATGCTGATATCTCG-3' (SEQ ID NO: 6), and the plasmid was constructed with primers F4-EcoRV+R4-EcoRV).

(III) Vector cloning experiments (1) The correct plasmids pCK-ccdB-Mu-1, pCK-ccdB-Mu-2, pCK-ccdB-Mu-3 and pCK-ccdB-Mu-4 constructed in step (II) were digested with a restriction enzyme EcoRV. Digestion products were subjected to 1% agarose gel electrophoresis, and gel was cut, recovered and purified.

(2) Two strands of primers of 24 bp and 48 bp were synthesized and annealed to form double-stranded DNA. Nucleotide sequences of the reversely complementary primers of 24 bp and 48 bp are shown by SEQ ID NO: 33-SEQ ID NO: 36 in Example 1.

(3) λ DNA was used as a template, and F-ADNA-200 bp+R-ADNA-200 bp were used as primers for the PCR amplification. Nucleotide sequences of the primers F-ADNA-200 bp and R-ADNA-200 bp are shown by SEQ ID NO: 37-SEQ ID NO: 38. A PCR system is shown in Table 1 in Example 1, and a PCR amplification program is shown in Table 7 in Example 1.

(4) A PCR solution obtained in step (3) was subjected to 1% agarose gel electrophoresis, and gel was cut, recovered and purified to obtain a PCR amplification product.

(5) Fragments of 24 bp and 48 bp formed after annealing in step (2) and a PCR product purified in step (4) were ligated to the prepared vectors in step (1), pCK-ccdB-Mu-1, pCK-ccdB-Mu-2, pCK-ccdB-Mu-3 and pCK-ccdB-Mu-4, separately. A ligation system is shown in Table 8 in Example 1, and a ligation condition was a ligation reaction of 1 h at 22° C.

(6) Each ligation product obtained in step (5) was transformed into Top10F' competent cells which were finally coated with the kanamycin-resistant LB plate and cultivated overnight at 37° C. 12 single clones were picked on each plate of the cloned DNA fragment of about 200 bp for colony PCR identification on the next day.

A PCR system is shown in Table 9 in Example 1, and a PCR amplification program is shown in Table 10 in Example 1.

Figure 2:
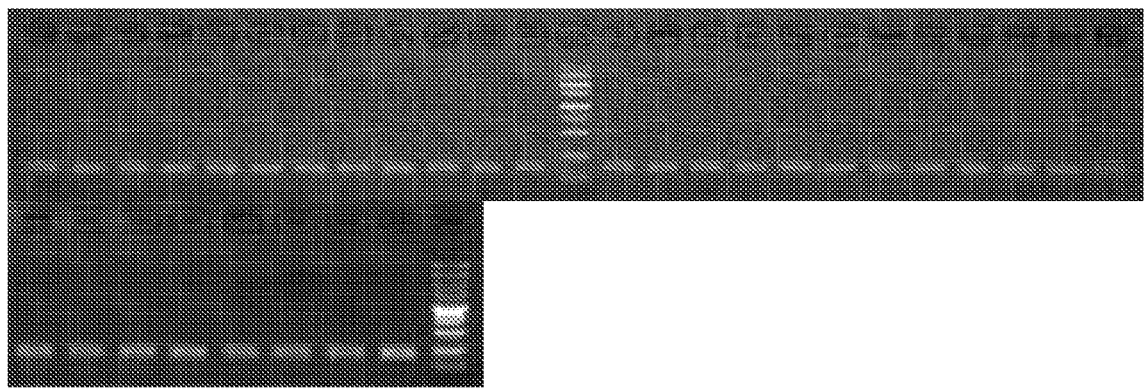
FIG. 2 is an electrophoresis diagram of colony PCR identification in Example 3 of the present application, where a size of a DNA marker is 0.1 kb, 0.25 kb, 0.5 kb, 0.75 kb, 1 kb, 1.5 kb, 2 kb, 3 kb and 5 kb.

A PCR identification result is shown in FIG. 2. The result in FIG. 2 shows that all colonies are positive clones. 12 single clones separately selected from the plates of the cloned foreign DNA fragments of 24 bp and 48 bp and single clones that were positive after colony identification were subjected to Sanger sequencing. Sequencing results show that all clones have correct sequences. Experimental results show that the vector of the present application may be used for cloning foreign DNA of 24 bp or more.

Example 4 Construction and function verification of a single-copy T vector

This example provides a method for constructing the single-copy T vector, which includes specific steps described below.

(I) The lacZα gene of pCC1 (chloramphenicol resistance) was replaced with a ccdB gene, specifically including steps described below.

(1) The chloramphenicol-resistant pCC1 plasmid was used as a template and SEQ ID NOs.: 47-48 were used as primers for PCR amplification. Specific sequences are as follows:

(forward primer):
SEQ ID NO. 47
ATGCAGGCTCGGTTCCAGCATGGTCATAGCTGTTTCCTGTGTGAAATTG
TTATCC;

(reverse primer):
SEQ ID NO. 48
AGCACCATTTGCAGCGATGCCGCCTAATTAAGCCAGCCCCGACACCCGC
CAACAC.

A PCR system is shown in Table 1 in Example 1, and reaction conditions are shown in Table 11.

TABLE 11

|  | Reaction Program | Number of Cycles |
| --- | --- | --- |
| Amplification program | 95° C. 4 min | 1 |
|  | 94° C. 30 s | 25 |
|  | 58° C. 30 s |  |
|  | 72° C. 5 min |  |
|  | 72° C. 8 min | 1 |
|  | 4° C. | 1 |

(2) A PCR solution obtained in step (1) was subjected to 1% agarose gel electrophoresis, and gel was cut, recovered and purified to obtain a PCR amplification product.

(3) The Gibson Assembly® Master Mix kit was used for ligating a PCR purified product obtained in step (2) and the ccdB gene obtained through a gene synthesis in Example 1. A ligation system is shown in Table 12.

TABLE 12

| PCR amplification product | About 440 ng, 10 μL |
| --- | --- |
| Gibson Assembly ® Master Mix | 10 μL |
| Sterilized and deionized H₂O | 0 μL |

A ligation condition was a ligation reaction of 1 h at 50° C.

(4) A ligation product obtained in step (3) was transformed into Top10F' competent cells which were finally coated with a chloramphenicol-resistant LB plate and cultivated overnight at 37° C. A single clone was picked and subjected to Sanger sequencing on the next day, and a plasmid with a correct sequence was reserved and named pCC1-ccdB.

(II) A sequence, 5'-CTTTATGCTTCCGGCTCG-3' (SEQ ID NO: 2), between −35 region and −10 region in a promoter region of the B-galactosidase of the pCC1-ccdB plasmid was mutated into a sequence that can be digested by the endonuclease to form blunt ends, which specifically includes steps described below.

(1) The pCC1-ccdB plasmid successfully constructed in step (I) was used as a template, and primers F1-PmlI+R1-PmlI, F2-PmlI+R2-PmlI, F3-PmlI+R3-PmlI and F4-PmlI+R4-PmlI (SEQ ID NO: 21-SEQ ID NO: 28) were used as primers for the PCR amplification. Specific sequences are listed in Table 13.

TABLE 13

| No. | Sequence |
| --- | --- |
| SEQ ID NO. 21 (F1-PmlI) | CCGGAAGCCACGTGTGTAAAGCCTGGGGTGCCTAATGAGTG |
| SEQ ID NO. 22 (R1-PmlI) | CCCCAGGCTTTACACACGTGGCTTCCGGCTCGTATGTTGTGTGGAATT |
| SEQ ID NO. 23 (F2-PmlI) | GAGCCGGACACGTGAAGTGTAAAGCCTGGGGTGCCTAATGAG |
| SEQ ID NO. 24 (R2-PmlII) | CAGGCTTTACACTTCACGTGTCCGGCTCGTATGTTGTGTGGAATTGTG |
| SEQ ID NO. 25 (F3-PmlI) | TACGAGCCCACGTGATAAAGTGTAAAGCCTGGGGTGCCTAAT |
| SEQ ID NO. 26 (R3-PmlI) | GCTTTACACTTTATCACGTGGGCTCGTATGTTGTGTGGAATTGTGAGC |
| SEQ ID NO. 27 (F4-PmlI) | ACATACGACACGTGAGCATAAAGTGTAAAGCCTGGGGTGCCT |
| SEQ ID NO. 28 (R4-PmlI) | TTACACTTTATGCTCACGTGTCGTATGTTGTGTGGAATTGTGAGCGGA |

A specific PCR system is shown in Table 1 in Example 1, and reaction conditions are shown in Table 11.

(2) A PCR solution obtained in step (1) was subjected to 1% agarose gel electrophoresis, and gel was cut, recovered and purified to obtain a PCR amplification product. The Gibson Assembly® Master Mix kit was used for a ligation reaction. A ligation system is shown in Table 14.

TABLE 14

| PCR amplification product | About 490 ng, 10 μL |
| --- | --- |
| Gibson Assembly ® Master Mix | 10 μL |
| Sterilized and deionized H₂O | 0 μL |

A ligation condition was a ligation reaction of 1 h at 50° C.

(3) Each ligation product obtained in step (2) was transformed into Top10F' competent cells which were finally coated with the kanamycin-resistant LB plate and cultivated overnight at 37° C. A single clone was picked and subjected to Sanger sequencing on the next day, and a plasmid with a correct sequence was reserved and separately named pCC1-ccdB-Mu-1 (5'-CTTTATGCTTCCGGCTCG-3' (SEQ ID NO: 2) was mutated into 5'-CACGTGGCTTCCGGCTCG-3', and the plasmid was constructed with primers F1-PmlI+R1-PmlI), pCC1-ccdB-Mu-2 (5'-CTTTATGCTTCCGGCTCG-3' (SEQ ID NO: 2) was mutated into 5'-CTTCACGTGTCCGGCTCG-3' (SEQ ID NO: 8), and the plasmid was constructed with primers F2-PmlI+R2-PmlI), pCC1-ccdB-Mu-3 (5'-CTTTATGCTTCCGGCTCG-3' (SEQ ID NO: 2) was mutated into 5'-CTTTATCACGTGGGCTCG-3' (SEQ ID NO: 9), and the plasmid was constructed with primers F3-PmlI+R3-PmlI), and pCC1-ccdB-Mu-4 (5'-CTTTATGCTTCCGGCTCG-3' (SEQ ID NO: 2) was mutated into 5'-CTTTATGCTCACGTGTCG-3' (SEQ ID NO: 52), and the plasmid was constructed with primers F4-PmlI+R4-PmlI).

(III) Vector cloning experiments (1) The correct plasmids pCC1-ccdB-Mu-1, pCC1-ccdB-Mu-2, pCC1-ccdB-Mu-3 and pCC1-ccdB-Mu-4 constructed in step (II) were digested with a restriction enzyme PmlI. Digestion products were subjected to 1% agarose gel electrophoresis, and gel was cut, recovered and purified.

(2) Reversely complementary primers of 24 bp and 48 bp were synthesized and annealed to form double-stranded DNA. Nucleotide sequences of the reversely complementary primers of 24 bp and 48 bp are shown by SEQ ID NO: 33-SEQ ID NO: 36 in Example 1.

(3) λ DNA was used as a template, and F-ADNA-200 bp+R-ADNA-200 bp were used as primers for the PCR amplification. Nucleotide sequences of the primers F-ADNA-200 bp and R-ADNA-200 bp are shown by SEQ ID NO: 37-SEQ ID NO: 38 in Example 1. A PCR system is shown in Table 1 in Example 1, and a PCR amplification program is shown in Table 7 in Example 1.

(4) A PCR solution obtained in step (3) was subjected to 1% agarose gel electrophoresis, and gel was cut, recovered and purified to obtain a PCR amplification product.

(5) Fragments of 24 bp and 48 bp formed after annealing in step (2) and a PCR product purified in step (4) were ligated to the prepared vectors in step (1), pCC1-ccdB-Mu-1, pCC1-ccdB-Mu-2, pCC1-ccdB-Mu-3 and pCC1-ccdB-Mu-4, separately. A ligation system is shown in Table 8 in Example 1, and a ligation condition was a ligation reaction of 1 h at 22° C.

(6) Each ligation product obtained in step (5) was transformed into Top10F' competent cells which were finally coated with the kanamycin-resistant LB plate and cultivated overnight at 37° C. 12 single clones were picked on each plate of the cloned DNA fragment of about 200 bp for colony PCR identification on the next day.

A PCR system is shown in Table 9 in Example 1, and a PCR amplification program is shown in Table 10 in Example 1.

Figure 3:
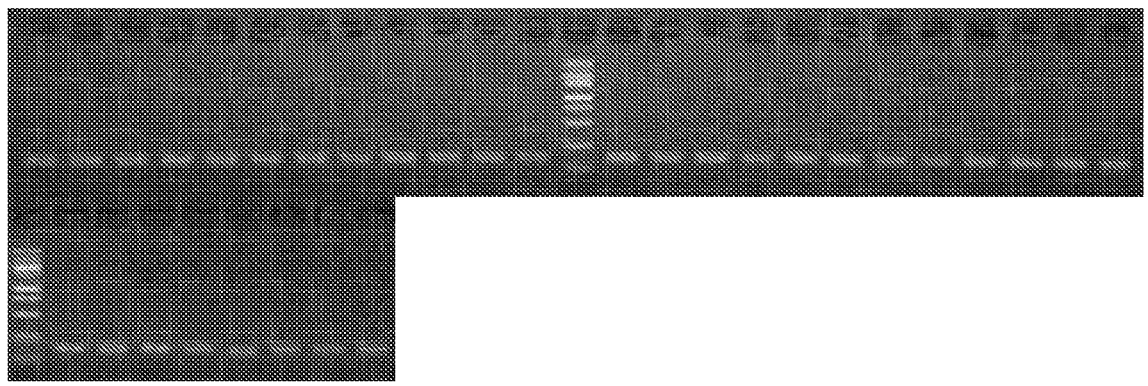
FIG. 3 is an electrophoresis diagram of colony PCR identification in Example 4 of the present application, where a size of a DNA marker is 0.1 kb, 0.25 kb, 0.5 kb, 0.75 kb, 1 kb, 1.5 kb, 2 kb, 3 kb and 5 kb.

A PCR identification result is shown in FIG. 3. The result in FIG. 3 shows that all colonies are positive clones. 12 single clones separately selected from the plates of the cloned foreign DNA fragments of 24 bp and 48 bp and single clones that were positive after colony identification were subjected to Sanger sequencing. Sequencing results show that all clones have correct sequences. Experimental results show that the vector of the present application may be used for cloning foreign DNA of 24 bp or more.

To conclude, the T vector of the present application clones the foreign DNA fragment between −10 region and −35 region in a promoter region of the B-galactosidase of the vector during TA cloning, so that even when induced by IPTG, the promoter of the β-galactosidase still has extremely low activity, and an expression amount of a gene toxic to a host is extremely small. In this way, a host of a recombinant vector containing the foreign DNA fragment can grow normally. However, since a strong promoter of an empty vector that is self-ligated and not ligated to the foreign DNA fragment due to the lack of 1-2 bases at the end of the vector still has strong activity, and the frameshift mutation of a screening gene does not occur, the expression in large quantities of the gene toxic to the host can be initiated, so that a host carrying a vector containing no foreign DNA fragment cannot grow. Therefore, the T vector of the present application can avoid false positive clones due to the frameshift mutation of the screening gene.

The applicant has stated that although the detailed method of the present application is described through the examples described above, the present application is not limited to the detailed method described above, which means that implementation of the present application does not necessarily depend on the detailed method described above. It should be apparent to those skilled in the art that any improvements made to the present application, equivalent replacements of raw materials of the product of the present application, additions of adjuvant ingredients to the product of the present application, and selections of specific manners, etc., all fall within the protection scope and the disclosed scope of the present application.

What is claimed is:

1. A cloning vector, comprising:
a) a promoter comprising a −35 region, a −10 region, and one or more recognition sites for an endonuclease between the −35 region and the −10 region of the promoter, wherein:
  i) a nucleic acid sequence between the −35 region and the −10 region is any one of SEQ ID NOs: 3-10; and
  ii) the endonuclease is EcoRV, AleI, BamHI, XhoI or PmlI, or a combination thereof; and
b) a gene regulated by the promoter, wherein the gene is toxic to a host.

2. The cloning vector of claim 1, wherein the −35 region is not mutated.

3. The cloning vector of claim 2, wherein the gene toxic to the host is a lethal gene or a restriction enzyme gene.

4. The cloning vector of claim 1, wherein the gene toxic to the host is a lethal gene or a restriction enzyme gene.

5. The cloning vector of claim 4, wherein the lethal gene is a ccdB gene.

6. The cloning vector of claim 5, wherein a nucleic acid sequence of the ccdB gene is SEQ ID NO: 11.

7. The cloning vector of claim 1, wherein the vector is constructed from any one or a combination of at least two of pUC18, pUC19, pUC57, pCA, pCK, pCC and pCC1.

8. The cloning vector of claim 1, wherein the vector is linearized and has blunt ends at a recognition site for an endonuclease in the promoter.

9. The cloning vector of claim 1, wherein the vector further comprises a foreign DNA inserted into the vector at a recognition site for an endonuclease in the promoter.

10. The cloning vector of claim 1, wherein the vector further comprises a lacI expression element.

11. A T vector comprising: the cloning vector of claim 1, wherein the cloning vector is a linearized cloning vector and has blunt ends at a recognition site for an endonuclease in the promoter; and one added 3' dideoxythymidine nucleotide at each end of the linearized cloning vector.

12. A recombinant vector comprising a foreign DNA and the T vector of claim 11, wherein the foreign DNA is ligated between the ends of the T vector.

13. A method for preparing the T vector of claim 11, comprising the following steps:
(1) replacing a lacZα gene on a vector with a gene toxic to a host, wherein the gene toxic to a host is regulated by an original promoter of a β-galactosidase;
(2) designing a primer for mutating a nucleic acid sequence between a −35 region and a −10 region in the original promoter to comprise one or more recognition sites for an endonuclease, and using the original promoter and a gene regulated by the original promoter as a template for PCR amplification, thereby producing a vector with a promoter comprising one or more recognition sites for an endonuclease, wherein the gene toxic to the host is regulated by the promoter comprising one or more recognition sites for an endonuclease;
(3) cyclizing the product in step (2) to obtain a cloning vector with the promoter comprising one or more recognition sites for an endonuclease; and (4) linearizing the cloning vector in step (3), thereby producing blunt ends, and adding one 3' dideoxythymidine nucleotide to each end of the linearized vector, to obtain the T vector.

14. The method of claim 13, wherein:
a nucleic acid sequence of the primer in step (2) is any one of SEQ ID NOs: 13-28;
the linearizing in step (4) is performed through endonuclease digestion and/or the PCR amplification;
the adding one 3' dideoxythymidine nucleotide in step (4) is performed with a terminal transferase or a Taq DNA polymerase;
before step (1), the method further comprises performing codon optimization on the gene toxic to the host;
after step (1), the method further comprises inserting a foreign DNA into the vector;
step (3) is performed by a Gibson recombination method; or a combination of the foregoing.

15. A host cell, comprising the cloning vector of claim 1, wherein the host cell is *Escherichia coli*.

16. A method for cloning, comprising:
adding one A base to each 3' end of a foreign DNA;
ligating the foreign DNA with added A bases to the T vector vector of claim 9, thereby producing a recombinant vector;
introducing the recombinant vector into a host cell; and
cultivating the host cell under appropriate conditions, to obrain a positibe clone; wherein the host cell is *Escherichia coli*.

17. A kit for cloning, comprising any one or a combination of at least two of:
(a) the cloning vector comprising the promoter of claim 1;
(b) a T vector comprising: the cloning vector of (a), wherein the cloning vector is linearized and has blunt ends at a recognition site for an endonuclease in the promoter; and one added 3' dideoxythymidine nucleotide at each end of the linearized cloning vector;
(c) a recombinant vector comprising a foreign DNA and the T vector of (b); wherein the foreign DNA is ligated between the ends of the T vector; and
(d) a host cell comprising the vector of any one of (a) to (c).

18. A cloning vector, comprising:
a) a promoter comprising a −35 region, a −10 region, and one or more recognition sites for an endonuclease between the −35 region and the −10 region of the promoter, wherein:
  i) a nucleic acid sequence between the −35 region and the −10 region is any one of SEQ ID NOs: 3-10; and
  ii) the endonuclease is EcoRV, AleI, BamHI, XhoI or PmlI, or a combination thereof;
b) a gene regulated by the promoter, is toxic to a host; and
c) a lacI expression element, wherein a nucleic acid sequence of the lacI expression element is SEQ ID NO: 12.

* * * * *

SEQUENCE LISTING

<160> NUMBER OF SEQ ID NOS: 52

<210> SEQ ID NO 1
<211> LENGTH: 30
<212> TYPE: DNA
<213> ORGANISM: Artificial Sequence
<220> FEATURE:
<223> OTHER INFORMATION: Nucleic acid sequence between -35 region and
      -10 region in the promoter region of beta-galactosidase

<400> SEQUENCE: 1
tttacacttt atgcttccgg ctcgtatgtt                                      30

<210> SEQ ID NO 2
<211> LENGTH: 18
<212> TYPE: DNA
<213> ORGANISM: Artificial Sequence
<220> FEATURE:
<223> OTHER INFORMATION: Nucleic acid sequence between -35 region and
      -10 region in the promoter region of beta-galactosidase

<400> SEQUENCE: 2
ctttatgctt ccggctcg                                                   18

<210> SEQ ID NO 3
<211> LENGTH: 18
<212> TYPE: DNA
<213> ORGANISM: Artificial Sequence
<220> FEATURE:
<223> OTHER INFORMATION: Nucleic acid sequence between -35 region and
      -10 region of improved promoter

<400> SEQUENCE: 3
gatatcgctt ccggctcg                                                   18

<210> SEQ ID NO 4
<211> LENGTH: 18
<212> TYPE: DNA
<213> ORGANISM: Artificial Sequence
<220> FEATURE:
<223> OTHER INFORMATION: Nucleic acid sequence between -35 region and
      -10 region of improved promoter

<400> SEQUENCE: 4
cttgatatct ccggctcg                                                   18

<210> SEQ ID NO 5
<211> LENGTH: 18
<212> TYPE: DNA
<213> ORGANISM: Artificial Sequence
<220> FEATURE:
<223> OTHER INFORMATION: Nucleic acid sequence between -35 region and
      -10 region of improved promoter

```
<400> SEQUENCE: 5
ctttatgata tcggctcg                                                 18

<210> SEQ ID NO 6
<211> LENGTH: 18
<212> TYPE: DNA
<213> ORGANISM: Artificial Sequence
<220> FEATURE:
<223> OTHER INFORMATION: Nucleic acid sequence between -35 region and
      -10 region of improved promoter

<400> SEQUENCE: 6
ctttatgctg atatctcg                                                 18

<210> SEQ ID NO 7
<211> LENGTH: 18
<212> TYPE: DNA
<213> ORGANISM: Artificial Sequence
<220> FEATURE:
<223> OTHER INFORMATION: Nucleic acid sequence between -35 region and
      -10 region of improved promoter

<400> SEQUENCE: 7
cacgtggctt ccggctcg                                                 18

<210> SEQ ID NO 8
<211> LENGTH: 18
<212> TYPE: DNA
<213> ORGANISM: Artificial Sequence
<220> FEATURE:
<223> OTHER INFORMATION: Nucleic acid sequence between -35 region and
      -10 region of improved promoter

<400> SEQUENCE: 8
cttcacgtgt ccggctcg                                                 18

<210> SEQ ID NO 9
<211> LENGTH: 18
<212> TYPE: DNA
<213> ORGANISM: Artificial Sequence
<220> FEATURE:
<223> OTHER INFORMATION: Nucleic acid sequence between -35 region and
      -10 region of improved promoter

<400> SEQUENCE: 9
ctttatcacg tgggctcg                                                 18

<210> SEQ ID NO 10
<211> LENGTH: 18
<212> TYPE: DNA
<213> ORGANISM: Artificial Sequence
<220> FEATURE:
<223> OTHER INFORMATION: Nucleic acid sequence between -35 region and
      -10 region of improved promoter

<400> SEQUENCE: 10
ctttatgctc acgtgtcg                                                 18

<210> SEQ ID NO 11
<211> LENGTH: 306
<212> TYPE: DNA
<213> ORGANISM: Artificial Sequence
<220> FEATURE:
<223> OTHER INFORMATION: ccdB gene

<400> SEQUENCE: 11
```

| | |
|---|---|
| atgcagttta aggtttacac ctataaaaga gagagccgtt atcgtctgtt tgtggatgta | 60 |
| cagagtgata ttattgacac gcccgggcga cggatggtga tccccctggc cagtgcacgt | 120 |
| ctgctgtcag ataaagtctc ccgtgaactt tacccggtgg tgcatatcgg ggatgaaagc | 180 |
| tggcgcatga tgaccaccga tatggccagt gtgccggtct ccgttatcgg ggaagaagtg | 240 |
| gctgatctca gccaccgcga aaatgacatc aaaaacgcca ttaacctgat gttctgggga | 300 |
| atataa | 306 |

<210> SEQ ID NO 12
<211> LENGTH: 1472
<212> TYPE: DNA
<213> ORGANISM: Artificial Sequence
<220> FEATURE:
<223> OTHER INFORMATION: Nucleic acid sequence of lacI expression element

<400> SEQUENCE: 12

| | |
|---|---|
| cccgctttcc agtcgggaaa cctgtcgtgc ttgacaccat cgaatggtgc aaaacctttc | 60 |
| gcggtatggc atgatagcgc ccggaagaga gtcaattcag ggtggtgaat atgaacgtga | 120 |
| aaccagtaac gttatacgat gtcgcagagt atgccggtgt ctcttatcag accgtttccc | 180 |
| gcgtggtgaa ccaggccagc cacgtttctg cgaaaacgcg ggaaaaagtg gaagcggcga | 240 |
| tggcggagct gaattacatt cccaaccgcg tggcacaaca actggcgggc aaacagtcgt | 300 |
| tgctgattgg cgttgccacc tccagtctgg ccctgcacgc gccgtcgcaa attgtcgcgg | 360 |
| cgattaaatc tcgcgccgat caactgggtg ccagcgtggt ggtgtcgatg gtagaacgaa | 420 |
| gcggcgtcga agcctgtaaa gcggcggtgc acaatcttct cgcgcaacgc gtcagtgggc | 480 |
| tgatcattaa ctatccgctg gatgaccagg atgccattgc tgtggaagct gcctgcacta | 540 |
| atgttccggc gttatttctt gatgtctctg accagacacc catcaacagt attatttttct | 600 |
| cccatgaaga cggtacgcga ctgggcgtgg agcatctggt cgcattgggt caccagcaaa | 660 |
| tcgcgctgtt agcgggccca ttaagttctg tctcggcgcg tctgcgtctg ctggctggc | 720 |
| ataaatatct cactcgcaat caaattcagc cgatagcgga acgggaaggc gactggagtg | 780 |
| ccatgtccgg ttttcaacaa accatgcaaa tgctgaatga gggcatcgtt cccactgcga | 840 |
| tgctggttgc caacgatcag atggcgctgg gcgcaatgcg cgccattacc gagtccgggc | 900 |
| tgcgcgttgg tgcggatatc tcggtagtgg gatacgacga taccgaagac agctcatgtt | 960 |
| atatcccgcc gttaaccacc atcaaacagg attttcgcct gctggggcaa accagcgtgg | 1020 |
| accgcttgct gcaactctct cagggccagg cggtgaaggg caatcagctg ttgcccgtct | 1080 |
| cactggtgaa aagaaaaacc accctggcgc ccaatacgca aaccgcctct ccccgcgcgt | 1140 |
| tggccgattc attaatgcag ctggcacgac aggtttcccg actggaaagc gggcagtgat | 1200 |
| gcctggcggc agtagcgcgg tggtcccacc tgaccccatg ccgaactcag aagtgaaacg | 1260 |
| ccgtagcgcc gatggtagtg tggggtctcc ccatgcgaga gtagggaact gccaggcatc | 1320 |
| aaataaaacg aaaggctcag tcgaaagact gggcctttga ttgcacgcag gttctccggc | 1380 |
| cgcttgggtg gagaggcgca gaaagtcaaa agcctccgac cggaggcttt tgactattag | 1440 |
| cacagctgca ttaatgaatc ggccaacgcg cg | 1472 |

<210> SEQ ID NO 13
<211> LENGTH: 41
<212> TYPE: DNA
<213> ORGANISM: Artificial Sequence
<220> FEATURE:

```
<223> OTHER INFORMATION: Primer

<400> SEQUENCE: 13
ccggaagcga tatctgtaaa gcctggggtg cctaatgagt g                               41

<210> SEQ ID NO 14
<211> LENGTH: 48
<212> TYPE: DNA
<213> ORGANISM: Artificial Sequence
<220> FEATURE:
<223> OTHER INFORMATION: Primer

<400> SEQUENCE: 14
ccccaggctt tacagatatc gcttccggct cgtatgttgt gtggaatt                        48

<210> SEQ ID NO 15
<211> LENGTH: 42
<212> TYPE: DNA
<213> ORGANISM: Artificial Sequence
<220> FEATURE:
<223> OTHER INFORMATION: Primer

<400> SEQUENCE: 15
gagccggaga tatcaagtgt aaagcctggg gtgcctaatg ag                              42

<210> SEQ ID NO 16
<211> LENGTH: 48
<212> TYPE: DNA
<213> ORGANISM: Artificial Sequence
<220> FEATURE:
<223> OTHER INFORMATION: Primer

<400> SEQUENCE: 16
caggctttac acttgatatc tccggctcgt atgttgtgtg gaattgtg                        48

<210> SEQ ID NO 17
<211> LENGTH: 42
<212> TYPE: DNA
<213> ORGANISM: Artificial Sequence
<220> FEATURE:
<223> OTHER INFORMATION: Primer

<400> SEQUENCE: 17
tacgagccga tatcataaag tgtaaagcct ggggtgccta at                              42

<210> SEQ ID NO 18
<211> LENGTH: 48
<212> TYPE: DNA
<213> ORGANISM: Artificial Sequence
<220> FEATURE:
<223> OTHER INFORMATION: Primer

<400> SEQUENCE: 18
gctttacact ttatgatatc ggctcgtatg ttgtgtggaa ttgtgagc                        48

<210> SEQ ID NO 19
<211> LENGTH: 42
<212> TYPE: DNA
<213> ORGANISM: Artificial Sequence
<220> FEATURE:
<223> OTHER INFORMATION: Primer

<400> SEQUENCE: 19
acatacgaga tatcagcata aagtgtaaag cctggggtgc ct                              42
```

```
<210> SEQ ID NO 20
<211> LENGTH: 48
<212> TYPE: DNA
<213> ORGANISM: Artificial Sequence
<220> FEATURE:
<223> OTHER INFORMATION: Primer

<400> SEQUENCE: 20
ttacacttta tgctgatatc tcgtatgttg tgtggaattg tgagcgga          48

<210> SEQ ID NO 21
<211> LENGTH: 41
<212> TYPE: DNA
<213> ORGANISM: Artificial Sequence
<220> FEATURE:
<223> OTHER INFORMATION: Primer

<400> SEQUENCE: 21
ccggaagcca cgtgtgtaaa gcctggggtg cctaatgagt g                 41

<210> SEQ ID NO 22
<211> LENGTH: 48
<212> TYPE: DNA
<213> ORGANISM: Artificial Sequence
<220> FEATURE:
<223> OTHER INFORMATION: Primer

<400> SEQUENCE: 22
ccccaggctt tacacacgtg gcttccggct cgtatgttgt gtggaatt          48

<210> SEQ ID NO 23
<211> LENGTH: 42
<212> TYPE: DNA
<213> ORGANISM: Artificial Sequence
<220> FEATURE:
<223> OTHER INFORMATION: Primer

<400> SEQUENCE: 23
gagccggaca cgtgaagtgt aaagcctggg gtgcctaatg ag                42

<210> SEQ ID NO 24
<211> LENGTH: 48
<212> TYPE: DNA
<213> ORGANISM: Artificial Sequence
<220> FEATURE:
<223> OTHER INFORMATION: Primer

<400> SEQUENCE: 24
caggctttac acttcacgtg tccggctcgt atgttgtgtg gaattgtg          48

<210> SEQ ID NO 25
<211> LENGTH: 42
<212> TYPE: DNA
<213> ORGANISM: Artificial Sequence
<220> FEATURE:
<223> OTHER INFORMATION: Primer

<400> SEQUENCE: 25
tacgagccca cgtgataaag tgtaaagcct ggggtgccta at                42

<210> SEQ ID NO 26
<211> LENGTH: 48
<212> TYPE: DNA
<213> ORGANISM: Artificial Sequence
<220> FEATURE:
<223> OTHER INFORMATION: Primer
```

-continued

<400> SEQUENCE: 26
gctttacact ttatcacgtg ggctcgtatg ttgtgtggaa ttgtgagc                48

<210> SEQ ID NO 27
<211> LENGTH: 42
<212> TYPE: DNA
<213> ORGANISM: Artificial Sequence
<220> FEATURE:
<223> OTHER INFORMATION: Primer

<400> SEQUENCE: 27
acatacgaca cgtgagcata aagtgtaaag cctggggtgc ct                       42

<210> SEQ ID NO 28
<211> LENGTH: 48
<212> TYPE: DNA
<213> ORGANISM: Artificial Sequence
<220> FEATURE:
<223> OTHER INFORMATION: Primer

<400> SEQUENCE: 28
ttacacttta tgctcacgtg tcgtatgttg tgtggaattg tgagcgga                48

<210> SEQ ID NO 29
<211> LENGTH: 54
<212> TYPE: DNA
<213> ORGANISM: Artificial Sequence
<220> FEATURE:
<223> OTHER INFORMATION: Primer

<400> SEQUENCE: 29
ttataggtgt aaaccttaaa ctgcatagct gtttcctgtg tgaaattgtt atcc         54

<210> SEQ ID NO 30
<211> LENGTH: 55
<212> TYPE: DNA
<213> ORGANISM: Artificial Sequence
<220> FEATURE:
<223> OTHER INFORMATION: Primer

<400> SEQUENCE: 30
attaacctga tgttctgggg aatataatta agccagcccc gacacccgcc aacac        55

<210> SEQ ID NO 31
<211> LENGTH: 29
<212> TYPE: DNA
<213> ORGANISM: Artificial Sequence
<220> FEATURE:
<223> OTHER INFORMATION: Primer

<400> SEQUENCE: 31
cagctgcatt aatgaatcgg ccaacgcgc                                     29

<210> SEQ ID NO 32
<211> LENGTH: 29
<212> TYPE: DNA
<213> ORGANISM: Artificial Sequence
<220> FEATURE:
<223> OTHER INFORMATION: Primer

<400> SEQUENCE: 32
gcacgacagg tttcccgact ggaaagcgg                                     29

<210> SEQ ID NO 33
<211> LENGTH: 24

```
<212> TYPE: DNA
<213> ORGANISM: Artificial Sequence
<220> FEATURE:
<223> OTHER INFORMATION: Primer

<400> SEQUENCE: 33
ttcatacagc aggctatgtt tagg                                          24

<210> SEQ ID NO 34
<211> LENGTH: 24
<212> TYPE: DNA
<213> ORGANISM: Artificial Sequence
<220> FEATURE:
<223> OTHER INFORMATION: Primer

<400> SEQUENCE: 34
cctaaacata gcctgctgta tgaa                                          24

<210> SEQ ID NO 35
<211> LENGTH: 48
<212> TYPE: DNA
<213> ORGANISM: Artificial Sequence
<220> FEATURE:
<223> OTHER INFORMATION: Primer

<400> SEQUENCE: 35
taagccgata ctgtattttt tatccatagc tgtttcctgt gtgaaatt                48

<210> SEQ ID NO 36
<211> LENGTH: 48
<212> TYPE: DNA
<213> ORGANISM: Artificial Sequence
<220> FEATURE:
<223> OTHER INFORMATION: Primer

<400> SEQUENCE: 36
aatttcacac aggaaacagc tatggataaa aaatacagta tcggctta                48

<210> SEQ ID NO 37
<211> LENGTH: 33
<212> TYPE: DNA
<213> ORGANISM: Artificial Sequence
<220> FEATURE:
<223> OTHER INFORMATION: Primer

<400> SEQUENCE: 37
gttgaatggg cggatgctaa ttactatctc ccg                                33

<210> SEQ ID NO 38
<211> LENGTH: 33
<212> TYPE: DNA
<213> ORGANISM: Artificial Sequence
<220> FEATURE:
<223> OTHER INFORMATION: Primer

<400> SEQUENCE: 38
ttatgctcta taaagtaggc ataaacaccc agc                                33

<210> SEQ ID NO 39
<211> LENGTH: 42
<212> TYPE: DNA
<213> ORGANISM: Artificial Sequence
<220> FEATURE:
<223> OTHER INFORMATION: Primer

<400> SEQUENCE: 39
```
acaacatacg agattcagca taaagtgtaa agcctggggt gc          42

<210> SEQ ID NO 40
<211> LENGTH: 39
<212> TYPE: DNA
<213> ORGANISM: Artificial Sequence
<220> FEATURE:
<223> OTHER INFORMATION: Primer

<400> SEQUENCE: 40
ctttatgctg aatctcgtat gttgtgtgga attgtgagc              39

<210> SEQ ID NO 41
<211> LENGTH: 42
<212> TYPE: DNA
<213> ORGANISM: Artificial Sequence
<220> FEATURE:
<223> OTHER INFORMATION: Primer

<400> SEQUENCE: 41
cacaacatac gagaatcagc ataaagtgta aagcctgggg tg          42

<210> SEQ ID NO 42
<211> LENGTH: 42
<212> TYPE: DNA
<213> ORGANISM: Artificial Sequence
<220> FEATURE:
<223> OTHER INFORMATION: Primer

<400> SEQUENCE: 42
cactttatgc tgattctcgt atgttgtgtg gaattgtgag cg          42

<210> SEQ ID NO 43
<211> LENGTH: 42
<212> TYPE: DNA
<213> ORGANISM: Artificial Sequence
<220> FEATURE:
<223> OTHER INFORMATION: Primer

<400> SEQUENCE: 43
acacaacata cgagatcagc ataaagtgta aagcctgggg tg          42

<210> SEQ ID NO 44
<211> LENGTH: 43
<212> TYPE: DNA
<213> ORGANISM: Artificial Sequence
<220> FEATURE:
<223> OTHER INFORMATION: Primer

<400> SEQUENCE: 44
acactttatg ctgatctcgt atgttgtgtg gaattgtgag cgg         43

<210> SEQ ID NO 45
<211> LENGTH: 54
<212> TYPE: DNA
<213> ORGANISM: Artificial Sequence
<220> FEATURE:
<223> OTHER INFORMATION: Primer

<400> SEQUENCE: 45
ttataggtgt aaaccttaaa ctgcatagct gtttcctgtg tgaaattgtt atcc   54

<210> SEQ ID NO 46
<211> LENGTH: 54
<212> TYPE: DNA
<213> ORGANISM: Artificial Sequence -continued

```
<220> FEATURE:
<223> OTHER INFORMATION: Primer

<400> SEQUENCE: 46
ttaacctgat gttctgggga atataattaa gccagccccg agtagctaga cagg        54

<210> SEQ ID NO 47
<211> LENGTH: 55
<212> TYPE: DNA
<213> ORGANISM: Artificial Sequence
<220> FEATURE:
<223> OTHER INFORMATION: Primer

<400> SEQUENCE: 47
atgcaggctc ggttccagca tggtcatagc tgtttcctgt gtgaaattgt tatcc       55

<210> SEQ ID NO 48
<211> LENGTH: 55
<212> TYPE: DNA
<213> ORGANISM: Artificial Sequence
<220> FEATURE:
<223> OTHER INFORMATION: Primer

<400> SEQUENCE: 48
agcaccattt gcagcgatgc cgcctaatta agccagcccc gacacccgcc aacac       55

<210> SEQ ID NO 49
<211> LENGTH: 17
<212> TYPE: DNA
<213> ORGANISM: Artificial Sequence
<220> FEATURE:
<223> OTHER INFORMATION: Nucleic acid sequence between -35 region and
      -10 region of improved promoter

<400> SEQUENCE: 49
ctttatgctg aatctcg                                                 17

<210> SEQ ID NO 50
<211> LENGTH: 17
<212> TYPE: DNA
<213> ORGANISM: Artificial Sequence
<220> FEATURE:
<223> OTHER INFORMATION: Nucleic acid sequence between -35 region and
      -10 region of improved promoter

<400> SEQUENCE: 50
ctttatgctg attctcg                                                 17

<210> SEQ ID NO 51
<211> LENGTH: 16
<212> TYPE: DNA
<213> ORGANISM: Artificial Sequence
<220> FEATURE:
<223> OTHER INFORMATION: Nucleic acid sequence between -35 region and
      -10 region of improved promoter

<400> SEQUENCE: 51
ctttatgctg atctcg                                                  16

<210> SEQ ID NO 52
<211> LENGTH: 18
<212> TYPE: DNA
<213> ORGANISM: Artificial Sequence
<220> FEATURE:
<223> OTHER INFORMATION: Nucleic acid sequence between -35 region and
      -10 region of improved promoter
```

-continued

```
<400> SEQUENCE: 52
ctttatgctc acgtgtcg                                                      18
```